United States Patent
Zhu et al.

(10) Patent No.: US 12,200,608 B2
(45) Date of Patent: Jan. 14, 2025

(54) COMMUNICATION METHOD AND RELATED DEVICE

(71) Applicant: HUAWEI TECHNOLOGIES CO., LTD., Guangdong (CN)

(72) Inventors: Yuanping Zhu, Shanghai (CN); Zhenzhen Cao, Beijing (CN); Mingzeng Dai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 644 days.

(21) Appl. No.: 17/401,855

(22) Filed: Aug. 13, 2021

(65) Prior Publication Data

US 2021/0377846 A1    Dec. 2, 2021

Related U.S. Application Data

(63) Continuation of application No. PCT/CN2020/075376, filed on Feb. 14, 2020.

(30) Foreign Application Priority Data

Feb. 15, 2019 (CN) .......................... 201910118117.2

(51) Int. Cl.
*H04W 48/16* (2009.01)
*H04L 5/00* (2006.01)
(Continued)

(52) U.S. Cl.
CPC ........... *H04W 48/16* (2013.01); *H04L 5/0053* (2013.01); *H04W 28/0862* (2023.05); *H04W 76/12* (2018.02)

(58) Field of Classification Search
None
See application file for complete search history.

(56) References Cited

U.S. PATENT DOCUMENTS

| 2012/0093070 A1* | 4/2012 | Huang ................ H04W 84/047 370/315 |
| 2018/0077605 A1 | 3/2018 | Maheshwari et al. |

(Continued)

FOREIGN PATENT DOCUMENTS

| CN | 101932007 A | 12/2010 |
| CN | 101986592 A | 3/2011 |

(Continued)

OTHER PUBLICATIONS

Ericsson, "Setup Procedure for the Adaptation Layer of an IAB Network," 3GPP TSG-RAN WG2 Meeting #104, R2-1816580, Spokane, USA, Nov. 12-16, 2018, 5 pages.

(Continued)

Primary Examiner — Minh Trang T Nguyen
(74) Attorney, Agent, or Firm — Fish & Richardson P.C.

(57) ABSTRACT

Embodiments of this application provide example communication methods and example devices. One example method includes sending information to a first node, where the information includes at least one of information about a first group of logical channel identities (LCIDs) or information about a second group of LCIDs, the first group of LCIDs includes an LCID used for access traffic, and the second group of LCIDs includes an LCID used for backhaul traffic. Another information can then be sent to the first node, where the another information is used to configure a radio link control (RLC) bearer of the first node, the RLC bearer includes a RLC layer entity and a logical channel, and when an LCID corresponding to the logical channel belongs to the first group of LCIDs, an upper protocol layer of a RLC layer is a packet data convergence protocol (PDCP) layer or an F1 interface protocol layer.

20 Claims, 6 Drawing Sheets

(51) Int. Cl.
*H04W 28/086* (2023.01)
*H04W 76/12* (2018.01)

(56) References Cited

U.S. PATENT DOCUMENTS

| | | | |
|---|---|---|---|
| 2019/0053288 A1 | 2/2019 | Zhou et al. | |
| 2019/0230736 A1* | 7/2019 | Quan | H04W 80/08 |
| 2021/0127319 A1* | 4/2021 | Huang | H04W 8/08 |
| 2021/0211939 A1* | 7/2021 | Teyeb | H04W 40/24 |

FOREIGN PATENT DOCUMENTS

| | | |
|---|---|---|
| CN | 102056242 A | 5/2011 |
| CN | 102111393 A | 6/2011 |
| CN | 103533576 A | 1/2014 |
| CN | 104602294 A | 5/2015 |
| CN | 105992392 A | 10/2016 |
| CN | 108282892 A | 7/2018 |
| CN | 108513323 A | 9/2018 |

OTHER PUBLICATIONS

Extended European Search Report issued in European Application No. 20755141.7 on Jun. 1, 2022, 20 pages.

Huawei, HiSilicon, "IAB bearer mapping decisions," 3GPP TSG-RAN WG2#104, R2-1817906, Spokane, USA, Nov. 12-16, 2018, 7 pages.

Nokia, Nokia Shanghai Bell, "Discussion on MAC subheader structures for IAB," 3GPP TSG-RAN WG2 Meeting #105, R2-1901258, Athens, Greece, Feb. 25-Mar. 1, 2019, 3 pages.

ZTE, "Discussion on user plane bearer mapping and comparison," 3GPP TSG-RAN WG2#103bis, R2-1814723, Chengdu, China, Oct. 8-12, 2018, 6 pages.

3GPP TR 38.874, V0.4.0 (Aug. 2018), "3rd Generation Partnership Project; Technical Specification Group Radio Access Network; Study on Integrated Access and Backhaul; (Release 15)," Aug. 2018, 55 pages.

EPO Partial Supplementary European Search Report in European Application No. 20755141.7 on Mar. 21, 2022, 15 pages.

Qualcomm Incorporated (Rapporteur), "Email discussion [103bis#31][NR-IAB] Adaptation layer in MT," 3GPP TSG-RAN WG2 Meeting #104, R2-1816873, Spokane, USA, Nov. 12-16, 2018, 9 pages.

Qualcomm Incorporated (Rapporteur), "Email discussion [103bis#32][NR-IAB] Unified Design," 3GPP TSG-RAN WG2 Meeting #103bis, R2-18XXXXX, Chengdu, China, Oct. 8-12, 2018, 20 pages.

Qualcomm, "New WID: Integrated Access and Backhaul for NR," 3GPP TSG RAN Meeting #82, RP-182723, Sorrento, Italy, Dec. 10-13, 2018, 7 pages.

Nokia et al., "Architecture and Protocols: MAC adaptation layer based IAB," 3GPP TSG-RAN WG3#99, R3-180993, Athens, Greece, Feb. 26-Mar. 2, 2018, 6 pages.

CATT, "Unified design and QoS Handling for IAB," 3GPP TSG-RAN WG2 Meeting #103bis, R2-1816885, Spokane, USA, Nov. 12-16, 2018, 5 pages.

Office Action in Chinese Application No. 201910118117.2, dated Jan. 6, 2021, 10 pages.

Office Action in Chinese Application No. 201910118117.2, dated Jun. 30, 2021, 6 pages.

PCT International Search Report and Written Opinion in International Application No. PCT/CN2020/075376, dated May 14, 2020, 15 pages.

* cited by examiner

400

500

COMMUNICATION METHOD AND RELATED DEVICE

CROSS-REFERENCE TO RELATED APPLICATIONS

This application is a continuation of International Application No. PCT/CN2020/075376, filed on Feb. 14, 2020, which claims priority to Chinese Patent Application No. 201910118117.2, filed on Feb. 15, 2019. The disclosures of the aforementioned applications are hereby incorporated by reference in their entireties.

TECHNICAL FIELD

This application relates to the field of communication technologies, and more specifically, to a communication method and a related device.

BACKGROUND

Compared with a 4th generation mobile communication system, a 5th generation (5G) mobile communication system imposes more stringent requirements on various network performance indicators in an all-round manner. For example, a capacity indicator is increased by 1000 times, wider coverage is required, and ultra-high reliability and an ultra-low latency are required. On the one hand, in consideration of abundant frequency resources on high-frequency carriers, high-frequency small cell networking is increasingly popular in hotspot areas to meet an ultra-high capacity requirement of 5G. The high frequency carrier has a relatively poor propagation feature, is severely attenuated by obstacles, and has small coverage. Therefore, a large quantity of small cells need to be densely deployed. Correspondingly, it is costly and difficult to provide fiber backhaul for the large quantity of densely deployed small cells. Therefore, an economical and convenient backhaul solution is required. On the other hand, to meet a wide coverage requirement, it is difficult and costly to deploy optical fibers to provide network coverage in some remote areas. Therefore, a flexible and convenient access and backhaul solution further needs to be designed. An integrated access and backhaul (IAB) technology provides an idea to resolve the foregoing two problems: A wireless transmission solution is used for both an access link and a backhaul link, to avoid optical fiber deployment. In an IAB network, a relay node (RN) or an IAB node may provide a wireless access traffic for user equipment (UE). Service data of the UE is transmitted by the IAB node through a wireless backhaul link to a connected donor node (IAB donor) or a donor base station (DgNB, Donor gNodeB).

In the IAB network, the IAB node may provide the wireless access traffic for a terminal, or may provide the wireless access traffic for a child node of the IAB node, and is connected to the donor node through the wireless backhaul link to transmit service data of the terminal device or the child node of the IAB node. However, in an existing mechanism, a method used by an IAB node to distinguish between an access traffic and a backhaul traffic is usually performed by using an IP layer header of service data. This affects communication efficiency of an IAB network to some extent.

SUMMARY

Each IAB node can communicate both an access traffic and a backhaul traffic on a wireless backhaul link with a parent node of the IAB node. However, because the IAB node processes the access traffic differently from the backhaul traffic, a mechanism that can be used by the IAB node to effectively distinguish between the access traffic and the backhaul traffic is urgently needed.

In view of this, this application provides a communication method and a related device. According to this method, an IAB node can accurately distinguish between a backhaul traffic and an access traffic, thereby improving information processing efficiency of an integrated access and backhaul network.

According to a first aspect, this application provides a communication method. The method may include: A first node receives a data packet from a second node, where the data packet includes data and a media access control MAC header, the MAC header includes first indication information, and the first indication information includes a logical channel identity LCID corresponding to the data packet; and the first node delivers the data to an upper protocol layer of an RLC layer of the first node based on the first indication information. According to this method, it is more easily to distinguish between an access traffic and a backhaul traffic, thereby reducing signaling overheads.

Alternatively, the data packet includes data and a radio link control RLC header, the RLC header includes second indication information, and the second indication information includes indication information of an access traffic or indication information of a backhaul traffic; and the first node delivers the data to an upper protocol layer of an RLC layer of the first node based on the second indication information. According to this method, when the access traffic and the backhaul traffic share a same RLC bearer, the access traffic and the backhaul traffic can be distinguished, and LCID space can be saved.

Alternatively, the first node receives third indication information, where the third indication information indicates a correspondence between an RLC layer entity and an upper protocol layer entity of an RLC layer of the first node. According to this method, the first node can be more flexibly indicated, by using signaling, to distinguish between an access traffic and a backhaul traffic.

The first node and the second node are nodes in wireless relay communication, and an upper protocol layer of an RLC layer includes any one of the following: a packet data convergence protocol PDCP layer, an adaptation Adapt layer, or an F1 interface protocol layer.

With reference to the first aspect, in a feasible design of the first aspect, that the first node delivers the data to an upper protocol layer of an RLC layer of the first node based on the first indication information includes: The first node delivers the data to the upper protocol layer of the RLC layer based on the LCID and a correspondence between the LCID and the upper protocol layer of the RLC layer.

With reference to the first aspect, in a feasible design of the first aspect, the first node receives information from a donor node, and the first node obtains the correspondence between the LCID and the upper protocol layer of the RLC layer based on the information.

With reference to the first aspect, in a feasible design of the first aspect, the information includes information about a first group of LCIDs and/or information about a second group of LCIDs, the first group of LCIDs includes an LCID used for the access traffic, and the second group of LCIDs includes an LCID used for the backhaul traffic; and if the LCID belongs to the first group of LCIDs, the upper protocol layer of the RLC layer is the PDCP layer or the F1 interface protocol layer; or if the LCID belongs to the second group of LCIDs, the upper protocol layer of the RLC layer is the Adapt layer.

With reference to the first aspect, in a feasible design of the first aspect, the information is used to configure an RLC bearer of the first node, where the RLC bearer includes a logical channel indicated by the LCID; and if the information includes a radio bearer identifier, the upper protocol layer of the RLC layer is the PDCP layer or the F1 interface protocol layer; or if the information does not include a radio bearer identifier, the upper protocol layer of the RLC layer is the Adapt layer.

With reference to the first aspect, in a feasible design of the first aspect, the information is used to configure an RLC bearer of the first node, where the RLC bearer includes a logical channel indicated by the LCID; the information includes indication information, and values of the indication information include a first value and a second value; and if the value of the indication information is the first value, the upper protocol layer of the RLC layer is the PDCP layer or the F1 interface protocol layer; or if the value of the indication information is the second value, the upper protocol layer of the RLC layer is the Adapt layer.

With reference to the first aspect, in a feasible design of the first aspect, that the first node delivers the data to an upper protocol layer of an RLC layer of the first node based on the second indication information includes: If the second indication information includes the indication information of the access traffic, the first node delivers the data to the PDCP layer or the F1 interface protocol layer of the first node; or if the second indication information includes the indication information of the backhaul traffic, the first node delivers the data to the adaptation layer Adapt layer of the first node.

With reference to the first aspect, in a feasible design of the first aspect, that the first node delivers the data to the upper protocol layer of the RLC layer of the first node based on the third indication information includes: The first node receives the data by using the RLC layer entity; and if the third indication information indicates that the RLC layer entity corresponds to a PDCP layer entity or an F1 interface protocol layer entity, the first node delivers the data to the PDCP layer or the F1 interface protocol layer of the first node, or the RLC layer entity of the first node delivers the data to the PDCP layer or the F1 interface protocol layer of the first node; or if the third indication information indicates that the RLC layer entity corresponds to an Adapt layer entity, the first node delivers the data to the Adapt layer of the first node, or the RLC layer entity of the first node delivers the data to the Adapt layer of the first node.

According to any one of the first aspect or the optional designs of the first aspect, a problem that how an IAB node distinguishes between an access traffic and a backhaul traffic can be changed to a problem that how the IAB node distinguishes between RLC bearers. In a first feasible design, for example, when an RLC bearer of the IAB node is configured by using RLC bearer configuration information (for example, the information may be referred to as or include an RLC-BearerConfig information element), third indication information is added to the RLC-BearerConfig information element, where the third indication information indicates whether the RLC bearer configured by using the RLC-BearerConfig information element is used to carry the access traffic or the backhaul traffic. In a second feasible design, for example, when configuring a logical channel of an RLC bearer of the IAB node by using RLC bearer configuration information (for example, the information may be referred to as or include an RLC-BearerConfig information element), a donor node indicates, based on whether the RLC-BearerConfig information element includes a radio bearer RB identifier, whether the RLC bearer configured by using the RLC-BearerConfig information element is used to carry the access traffic or the backhaul traffic, and the IAB node may determine, based on whether the RLC-BearerConfig information element includes the radio bearer RB identifier, whether the RLC bearer configured by using the RLC-BearerConfig information element is used to carry the access traffic or the backhaul traffic. In a third feasible design, before configuring an RLC bearer of the IAB node, a donor node may notify LCID grouping information to an MT of the IAB node by using an RRC message or a DU of a parent node of the IAB node by using an F1AP message. For example, the LCID grouping information includes information about a first group of LCIDs and/or a second group of LCIDs. When a logical channel of the RLC bearer of the IAB node is configured by using RLC bearer configuration information (for example, the information may be referred to as or include an RLC-BearerConfig information element), the IAB node may determine whether an LCID included in the RLC-BearerConfig information element belongs to the first group of LCIDs or the second group of LCIDs, to determine whether the RLC bearer configured by using the RLC-BearerConfig information element is used to carry the access traffic or the backhaul traffic. In a fourth feasible design, an RLC header of a data packet between nodes includes second indication information, and the second indication information indicates a node that receives the data packet to deliver data to an upper protocol layer of an RLC layer. According to the foregoing feasible design, the IAB node can distinguish whether the RLC bearer of the IAB node configured by the donor node is used to carry the access traffic or the backhaul traffic, and further accurately and effectively distinguish between the access traffic and the backhaul traffic. Therefore, information processing efficiency of an integrated access and backhaul network is improved. According to a second aspect, this application provides a communication method. The method may include: A second node sends a data packet to a first node; or the second node sends third indication information to the first node, where the third indication information indicates a correspondence between an RLC layer entity and an upper protocol layer entity of an RLC layer of the first node.

The data packet includes data and a media access control MAC header, the MAC header includes first indication information, and the first indication information includes a logical channel identity LCID that corresponds to the data and that is determined by the second node; or the data packet includes data and a radio link control RLC header, the RLC header includes second indication information, and the second indication information includes indication information that is of an access traffic or indication information that is of a backhaul traffic and that is determined by the second node, where the first indication information or the second indication information is used to indicate the first node to deliver the data to an upper protocol layer of the RLC layer; and the first node and the second node are nodes in wireless relay communication, and an upper protocol layer of an RLC layer includes any one of the following: a packet data convergence protocol PDCP layer, an adaptation Adapt layer, or an F1 interface protocol layer.

With reference to the second aspect, in a feasible design of the second aspect, that the LCID corresponding to the data packet is determined includes: The second node receives the data through an RLC channel, and the second node determines the LCID corresponding to the RLC channel.

With reference to the second aspect, in a feasible design of the second aspect, the second node receives information from a donor node, and the second node obtains a correspondence between the RLC channel and the LCID based on the information.

With reference to the second aspect, in a feasible design of the second aspect, that the second node obtains a correspondence between the RLC channel and the LCID based on the information includes: The information is used to configure an RLC bearer of the second node, where the RLC bearer includes a logical channel indicated by the LCID; and if the information includes a radio bearer identifier, the RLC channel corresponding to the LCID is a channel between the RLC layer and the PDCP layer or the F1 interface protocol layer; or if the information does not include a radio bearer identifier, the RLC channel corresponding to the LCID is a channel between the RLC layer and the Adapt layer.

With reference to the second aspect, in a feasible design of the second aspect, that the second node obtains a correspondence between the RLC channel and the LCID based on the information includes: The information includes information about a first group of LCIDs and/or information about a second group of LCIDs, the first group of LCIDs are LCIDs used for the access traffic, and the second group of LCIDs are LCIDs used for the backhaul traffic; and if the RLC channel is a channel between the RLC layer and the PDCP layer or the F1 interface protocol layer, the second node determines, in the first group of LCIDs, the LCID corresponding to the RLC channel; or if the RLC channel is a channel between the RLC layer and the Adapt layer, the second node determines, in the second group of LCIDs, the LCID corresponding to the data packet.

With reference to the second aspect, in a feasible design of the second aspect, that the second node obtains a correspondence between the RLC channel and the LCID based on the information includes: The information is used to configure an RLC bearer of the second node, where the RLC bearer includes a logical channel indicated by the LCID; the information includes indication information, and values of the indication information include a first value and a second value; and if the value of the indication information is the first value, the RLC channel corresponding to the LCID is a channel between the RLC layer and the PDCP layer or the F1 interface protocol layer; or if the value of the indication information is the second value, the RLC channel corresponding to the LCID is a channel between the RLC layer and the Adapt layer.

With reference to the second aspect, in a feasible design of the second aspect, that the second node determines the indication information of the access traffic or the indication information of the backhaul traffic includes: The second node receives the data through an RLC channel, where if the RLC channel is a channel between the RLC layer and the PDCP layer or the F1 interface protocol layer, the second node determines that the second indication information is the indication information of the access traffic; or if the RLC channel is a channel between the RLC layer and the Adapt layer, the second node determines that the second indication information is the indication information of the backhaul traffic.

With reference to the first aspect or the second aspect, in a feasible design of the first aspect or the second aspect, the F1 interface protocol layer is a protocol layer on a logical interface between a centralized unit CU of the donor node and a distributed unit DU of the first node; a user plane of the F1 interface protocol layer includes a GPRS tunneling protocol-user plane protocol GTP layer, a user datagram protocol UDP layer, and an internet protocol IP layer; and a control plane of the F1 interface protocol layer includes an F1 interface application F1AP layer, a stream control transmission protocol SCTP layer, and an internet protocol IP layer.

According to a third aspect, this application provides a communication method. The method may include: A first node receives a data packet from a second node, where the data packet includes data and a media access control MAC header, the MAC header includes first indication information, and the first indication information includes a logical channel identity LCID corresponding to the data packet; or the data packet includes data and a radio link control RLC header, the RLC header includes second indication information, and the second indication information includes indication information of an access traffic or indication information of a backhaul traffic; and the first node delivers the data to an upper protocol layer of an RLC layer or an F1 interface protocol layer of the first node based on the first indication information or the second indication information, where the first node and the second node are nodes in wireless relay communication, and an upper protocol layer of an RLC layer includes a packet data convergence protocol PDCP layer or an adaptation Adapt layer.

With reference to the third aspect, in a feasible design of the third aspect, that the first node delivers the data to an upper protocol layer of an RLC layer or an F1 interface protocol layer of the first node based on the first indication information includes: The first node delivers the data to the upper protocol layer of the RLC layer or the F1 interface protocol layer based on the LCID and a correspondence between the LCID and the upper protocol layer of the RLC layer or the F1 interface protocol layer.

With reference to the third aspect, in a feasible design of the third aspect, the first node receives information from a donor node, and the first node obtains the correspondence between the LCID and the upper protocol layer of the RLC layer or the F1 interface protocol layer based on the information.

With reference to the third aspect, in a feasible design of the third aspect, the information includes information about a first group of LCIDs and/or information about a second group of LCIDs, the first group of LCIDs includes an LCID used for the access traffic, and the second group of LCIDs includes an LCID used for the backhaul traffic; and if the LCID belongs to the first group of LCIDs, the data is delivered to the PDCP layer or the F1 interface protocol layer of the first node; or if the LCID belongs to the second group of LCIDs, the upper protocol layer of the RLC layer is the Adapt layer.

With reference to the third aspect, in a feasible design of the third aspect, the information is used to configure an RLC bearer of the first node, where the RLC bearer includes a logical channel indicated by the LCID; and if the information includes a radio bearer identifier, the data is delivered to the PDCP layer or the F1 interface protocol layer of the first node; or if the information does not include a radio bearer identifier, the upper protocol layer of the RLC layer is the Adapt layer.

With reference to the third aspect, in a feasible design of the third aspect, the information is used to configure an RLC bearer of the first node, where the RLC bearer includes a logical channel indicated by the LCID; the information includes indication information, and values of the indication information include a first value and a second value; and if the value of the indication information is the first value, the data is delivered to the PDCP layer or the F1 interface protocol layer of the first node; or if the value of the indication information is the second value, the upper protocol layer of the RLC layer is the Adapt layer.

With reference to the third aspect, in a feasible design of the third aspect, that the first node delivers the data to an upper protocol layer of an RLC layer or an F1 interface protocol layer of the first node based on the second indication information includes: If the second indication information includes the indication information of the access traffic, the first node delivers the data to the PDCP layer or the F1 interface protocol layer of the first node; or if the second indication information includes the indication information of the backhaul traffic, the first node delivers the data to the adaptation layer Adapt layer of the first node.

According to a fourth aspect, this application provides a communication method. The method may include: A second node sends a data packet to a first node, where the data packet includes data and a media access control MAC header, the MAC header includes first indication information, and the first indication information includes a logical channel identity LCID that corresponds to the data and that is determined by the second node; or the data packet includes data and a radio link control RLC header, the RLC header includes second indication information, and the second indication information includes indication information that is of an access traffic or indication information that is of a backhaul traffic and that is determined by the second node, where the first indication information or the second indication information is used to indicate the first node to deliver the data to an upper protocol layer of an RLC layer of an F1 interface protocol layer; and the first node and the second node are nodes in wireless relay communication, and an upper protocol layer of an RLC layer includes a packet data convergence protocol PDCP layer or an adaptation Adapt layer.

With reference to the fourth aspect, in a feasible design of the fourth aspect, that the LCID corresponding to the data packet is determined includes: The second node receives the data through an RLC channel, and the second node determines the LCID corresponding to the RLC channel; or the second node receives the data through a channel between the RLC layer and the F1 interface protocol layer, and the second node determines the LCID corresponding to the channel.

With reference to the fourth aspect, in a feasible design of the fourth aspect, the second node receives information from a donor node, and the second node obtains a correspondence between the RLC channel and the LCID based on the information; or the second node obtains a correspondence between the LCID and the channel between the RLC layer and the F1 interface protocol layer based on the information.

With reference to the fourth aspect, in a feasible design of the fourth aspect, that the second node obtains a correspondence between the LCID and the RLC channel or between the LCID and the channel between the RLC layer and the F1 interface protocol layer based on the information includes: The information is used to configure an RLC bearer of the second node, where the RLC bearer includes a logical channel indicated by the LCID; and if the information includes a radio bearer identifier, the RLC channel corresponding to the LCID is a channel between the RLC layer and the PDCP layer, or the LCID corresponds to the channel between the RLC layer and the F1 interface protocol layer; or if the information does not include a radio bearer identifier, the RLC channel corresponding to the LCID is a channel between the RLC layer and the Adapt layer.

With reference to the fourth aspect, in a feasible design of the fourth aspect, that the second node obtains a correspondence between the LCID and the RLC channel or between the LCID and the channel between the RLC layer and the F1 interface protocol layer based on the information includes: The information includes information about a first group of LCIDs and/or information about a second group of LCIDs, the first group of LCIDs are LCIDs used for the access traffic, and the second group of LCIDs are LCIDs used for the backhaul traffic; and if the RLC channel is a channel between the RLC layer and the PDCP layer, or the second node receives the data through the channel between the RLC layer and the F1 interface protocol layer, the second node determines, in the first group of LCIDs, the LCID corresponding to the RLC channel or the channel; or if the RLC channel is a channel between the RLC layer and the Adapt layer, the second node determines, in the second group of LCIDs, the LCID corresponding to the data packet.

With reference to the fourth aspect, in a feasible design of the fourth aspect, that the second node obtains a correspondence between the LCID and the RLC channel or between the LCID and the channel between the RLC layer and the F1 interface protocol layer based on the information includes: The information is used to configure an RLC bearer of the second node, where the RLC bearer includes a logical channel indicated by the LCID; the information includes indication information, and values of the indication information include a first value and a second value; and if the value of the indication information is the first value, the RLC channel corresponding to the LCID is a channel between the RLC layer and the PDCP layer, or the LCID corresponds to the channel between the RLC layer and the F1 interface protocol layer; or if the value of the indication information is the second value, the RLC channel corresponding to the LCID is a channel between the RLC layer and the Adapt layer.

With reference to the fourth aspect, in a feasible design of the fourth aspect, that the second node determines the indication information of the access traffic or the indication information of the backhaul traffic includes: The second node receives the data through the RLC channel or the channel between the RLC layer and the F1 interface protocol layer, where if the RLC channel is a channel between the RLC layer and the PDCP layer, the second node determines that the second indication information is the indication information of the access traffic; or if the RLC channel is a channel between the RLC layer and the Adapt layer, the second node determines that the second indication information is the indication information of the backhaul traffic.

According to a fifth aspect, this application provides a communication method. The method may include: A donor node sends information to a first node, where the information includes information about a first group of LCIDs and/or information about a second group of LCIDs, the first group of LCIDs includes an LCID used for an access traffic, and the second group of LCIDs includes an LCID used for a backhaul traffic; or the information is used to configure an RLC bearer of the first node, where the RLC bearer includes an RLC layer entity and a logical channel, and if the information includes a radio bearer identifier, an upper protocol layer of an RLC layer is a PDCP layer or an F1 interface protocol layer; or if the information does not include a radio bearer identifier, an upper protocol layer of an RLC layer is an Adapt layer; or the information is used to configure an RLC bearer of the first node, where the RLC bearer includes an RLC layer entity and a logical channel, the information includes indication information, and values of the indication information include a first value and a second value; and if the value of the indication information is the first value, an upper protocol layer of an RLC layer is a PDCP layer or an F1 interface protocol layer; or if the value of the indication information is the second value, an upper protocol layer of an RLC layer is an Adapt layer; and the donor node and the first node are nodes in wireless relay communication.

With reference to the fifth aspect, in a feasible design of the fifth aspect, the information includes the information about the first group of LCIDs and/or the information about the second group of LCIDs, the first group of LCIDs includes the LCID used for the access traffic, and the second group of LCIDs includes the LCID used for the backhaul traffic; and the method further includes: The donor node sends another information to the first node, where the information is used to configure the RLC bearer of the first node, the RLC bearer includes the RLC layer entity and the logical channel, and if an LCID corresponding to the logical channel belongs to the first group of LCIDs, the upper protocol layer of the RLC layer is the PDCP layer or the F1 interface protocol layer; or if an LCID corresponding to the logical channel belongs to the second group of LCIDs, the upper protocol layer of the RLC layer is the Adapt layer.

With reference to any one of the first aspect to the fifth aspect, the F1 interface protocol layer is a protocol layer on a logical interface between a centralized unit CU of the donor node and a distributed unit DU of the first node; a user plane of the F1 interface protocol layer includes a GPRS tunneling protocol-user plane GTP-U layer, a user datagram protocol UDP layer, and an internet protocol IP layer; and a control plane of the F1 interface protocol layer includes an F1 interface application F1AP layer, a stream control transmission protocol SCTP layer, and an internet protocol IP layer.

According to a sixth aspect, this application provides a communication apparatus. The communication apparatus may include at least one processor, and related program instructions are executed in the at least one processor, to implement a function of the first node, the second node, or the donor node in the method according to any one of the first aspect to the fifth aspect and the designs thereof. Optionally, the communication apparatus may further include at least one memory, and the memory stores the related program instructions. The communication apparatus may be the first node, the second node, or the donor node in the method according to any one of the first aspect to the fifth aspect and the designs thereof.

According to a seventh aspect, this application provides a system chip. The system chip may be used in a communication apparatus. The system chip includes at least one processor, and related program instructions are executed in the at least one processor, to implement a function of the first node, the second node, or the donor node in the method according to any one of the first aspect to the fifth aspect and the designs thereof. Optionally, the system chip may further include at least one memory, and the memory stores the related program instructions.

According to an eighth aspect, this application provides a computer storage medium. The computer storage medium may be used in a communication apparatus. The computer-readable storage medium stores program instructions. When the related program instructions are run, a function of the first node, the second node, or the donor node in the method according to any one of the first aspect to the fifth aspect and the designs thereof is implemented.

According to a ninth aspect, this application provides a computer program product. The computer program product includes program instructions. When the related program instructions are executed, a function of the first node, the second node, or the donor node in the method according to any one of the first aspect to the fifth aspect and the designs thereof is implemented.

According to a tenth aspect, this application provides a communication system. The system may include any one or more of the following: the first node, the second node, or the donor node in the method according to any one of the first aspect to the fifth aspect and the designs thereof the communication apparatus according to the sixth aspect; the system chip according to the seventh aspect; the computer storage medium according to the eighth aspect; or the computer program product according to the ninth aspect.

BRIEF DESCRIPTION OF DRAWINGS

The accompanying drawings, which may be included in this specification and constitute a part of this specification, together with this specification show example embodiments, or features and aspects of this application, and are used to explain principles of this application. It is clear that the accompanying drawings in the following descriptions merely show some embodiments of this application, and a person of ordinary skill in the art may further derive other drawings from these accompanying drawings without creative efforts.

DESCRIPTION OF EMBODIMENTS

Figure 1A:
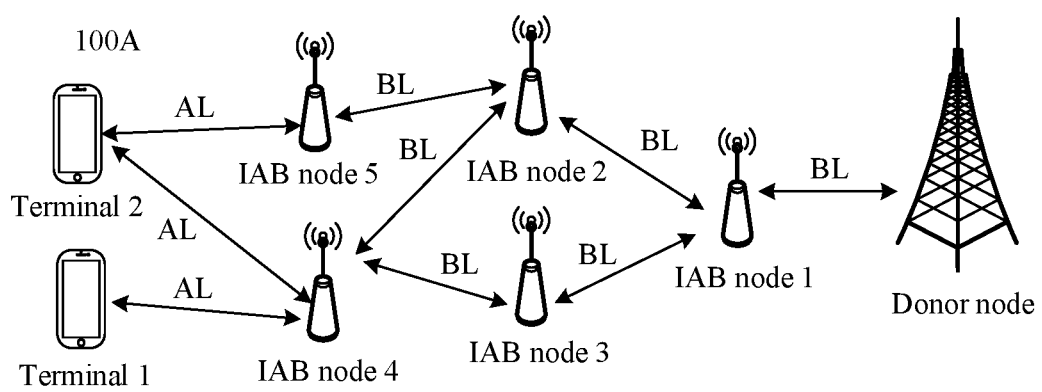
FIG. 1A is a schematic diagram of a possible communication system according to this application.

The following describes technical solutions in this application with reference to the accompanying drawings.

In the descriptions of this application, terms such as "first" and "second" are merely used for distinction and description, and should not be understood as an indication or implication of relative importance, or as an indication or implication of an order. For information with different numbers, such as "first information" in this application, the numbers are merely used for contextual convenience, and different sequence numbers do not have specific technical meanings. For example, first information or second information may be understood as one or any one of a series of pieces of information. A function of the numbered information, for example, may be determined based on context content of the numbered information and/or a function of information carried in the numbered information. It may be understood that, during specific implementation, information with different numbers may be same information or a same type of information, and the information with different numbers may be carried in a same message or a same type of message, or the information with different numbers may be a same message or a same type of message. This is not limited in this application.

The term such as "operation 201" or "operation 202" in this application is merely used for distinction and description, and cannot be understood as an indication or implication of relative importance of an operation, or as an indication or implication of an execution sequence of an operation.

The term "and/or" in this application describes only an association relationship for describing associated objects and represents that three relationships may exist. For example, A and/or B may represent the following three cases: Only A exists, A and B coexist, and only B exists. In addition, the character "/" in this specification generally indicates an "or" relationship between the associated objects.

For example, a feature or content marked by a dashed line in the figures in the embodiments of this application is an optional operation or an optional structure in the embodiments.

In this application, the terms "may include", "have", and any other variants are intended to cover the non-exclusive inclusion, for example, a process, method, system, product, or device that includes a list of steps or units is not necessarily limited to those steps or units that are clearly listed, but may include other steps or units not clearly listed or inherent to the process, method, product, or device.

Specific names of some information or information elements in this application are merely examples. Certainly, the information or information elements may also be referred to as other names in actual use. This is not limited in this application.

The technical solutions in the embodiments of this application may be applied to various communication systems, for example, a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a new radio (NR) system in a 5th generation (5G) mobile communication system, and other network systems, for example, a multi-hop network and a multi-connectivity network that can be used to provide a mobile communication service. This is not limited in this application.

With development of technologies such as virtual reality (VR), augmented reality (AR), and an internet of things, there will be an increasing quantity of terminals in a future network, and network data usage will also continuously increase. To adapt to an increasing quantity of terminals and rapidly increasing network data usage in the market, higher requirements are imposed on a capacity of a 5G network currently. High-frequency small cell networking is increasingly popular in hotspot areas to meet an ultra-high capacity requirement of 5G. A high frequency carrier has a relatively poor propagation feature, is severely attenuated by obstacles, and has small coverage. Therefore, a large quantity of small cells need to be densely deployed in the hotspot areas. The small cells may be integrated access and backhaul IAB nodes.

Network elements in this application may include a terminal and an integrated access and backhaul IAB node.

In this application, for example, the terminal device is generally a device that has a capability of communicating with a network side device, for example, may be user equipment (UE), an access terminal device, a subscriber unit, a subscriber station, a mobile station, a mobile station, a remote station, a remote terminal device, a mobile device, a user terminal device, a wireless terminal device, a user agent, or a user apparatus. For example, the terminal device may alternatively be a cellular phone, a cordless phone, a session initiation protocol (SIP) phone, a wireless local loop (WLL) station, a personal digital assistant (PDA), a handheld device or a computing device having a wireless communication function, another processing device connected to a wireless modem, a vehicle-mounted device, a wearable device, a terminal device in a future 5G network, a terminal device in a future evolved public land mobile network (PLMN), or a vehicle device in vehicle-to-everything (V2X). For example, an MT of the IAB node may also be considered as a terminal in this application. A specific implementation form of the terminal device is not limited in the embodiments of this application.

In this application, for example, the integrated access and backhaul IAB node is configured to provide a wireless backhaul traffic for a node (for example, a terminal) that accesses the integrated access and backhaul node in a wireless manner. The wireless backhaul traffic is a data and/or signaling backhaul traffic provided through a wireless backhaul link.

A system architecture and a service scenario that are described in the embodiments of this application are intended to describe the technical solutions in the embodiments of this application more clearly, and do not constitute a limitation to the technical solutions provided in the embodiments of this application. A person of ordinary skill in the art may know that with evolution of the network architecture and emergence of a new service scenario, the technical solutions provided in the embodiments of this application are also applicable to a similar technical problem. In the embodiments of this application, an example in which a provided method is applied to an NR system or a 5G network is used for description. However, it should be noted that the method provided in the embodiments of this application may also be applied to another network, for example, may be applied to an evolved packet system (EPS) network (namely, a 4th generation (4G) network). Correspondingly, when the method provided in the embodiments of this application is applied to the EPS network, a network node performing the method provided in the embodiments of this application is replaced with a network node in the EPS network. For example, when the method provided in the embodiments of this application is applied to the 5G network or the NR system, an integrated access and backhaul node in the following descriptions may be an integrated access and backhaul node in the 5G network. For example, the integrated access and backhaul node in the 5G network may be referred to as an IAB node, and certainly may also have another name. This is not specifically limited in the embodiments of this application. When the method provided in the embodiments of this application is applied to the EPS network, an integrated access and backhaul node in the following descriptions may be an integrated access and backhaul node in the EPS network. For example, the integrated access and backhaul node in the EPS network may be referred to as a relay node (RN). For example, the IAB node may be a device such as customer-premises equipment (CPE) or a residential gateway (RG). In this case, the method provided in the embodiments of this application may further be applied to a home access scenario. A specific implementation form of the IAB node is not limited in the embodiments of this application.

To design a flexible and convenient access and backhaul solution, a wireless transmission solution is used for both an access link (AL) and a backhaul link (BL) in an IAB scenario.

In a network including an IAB node (referred to as an IAB network for short below), the IAB node may provide a wireless access traffic for a terminal, and is connected to a donor node through a wireless backhaul link to transmit service data of a user.

The IAB node may include an MT (mobile terminal) and a DU (DU). When facing a parent node of the IAB node, the IAB node may be considered as a terminal device, namely, a role of the MT. When facing a child node of the IAB node (where the child node may be another IAB node or common UE), the IAB node may be considered as a network device, namely, a role of the DU.

For example, the donor node may be a donor base station. The donor node may be referred to as an IAB donor or a DgNB (namely, a donor gNodeB) for short in the 5G network. The donor node may be a complete entity, or may be in a form in which a centralized unit (CU) (referred to a donor-CU or a CU for short in this specification) and a distributed unit (DU) (referred to as a donor-DU for short in this specification) are separated, that is, the donor node includes the donor-CU and the donor-DU. In the embodiments of this application and the accompanying drawings, an example in which the donor node includes the donor-CU and the donor-DU is used to describe the method provided in the embodiments of this application.

The donor-CU may further be in a form in which a user plane (UP) (referred to as a CU-UP for short in this specification) and a control plane (CP) (referred to as a CU-CP for short in this specification) are separated, that is, the donor-CU includes the CU-CP and the CU-UP.

The IAB node is connected to a core network through the donor node via a wired link. For example, in a 5G standalone architecture, an IAB node is connected to a core network (5G core, 5GC) of a 5G network through a donor node via a wired link. In a 5G non-standalone architecture, an IAB node is connected to an evolved packet core (EPC) through an evolved NodeB (eNB) on a control plane, and is connected to the EPC through a donor node and an eNB on a user plane.

To ensure reliability of service transmission, an IAB network supports multi-hop IAB node networking and multi-connectivity IAB node networking. Therefore, there may be a plurality of transmission paths between a terminal and a donor node. On one path, there is a determined hierarchical relationship between IAB nodes, and between an IAB node and a donor node serving the IAB node. Each IAB node considers, as a parent node, a node providing a backhaul traffic for the IAB node. Correspondingly, the IAB node may be considered as a child node of the parent node of the IAB node.

For example, referring to FIG. 1A, a parent node of an IAB node 1 is a donor node, the IAB node 1 is a parent node of an IAB node 2 and an IAB node 3, both the IAB node 2 and the IAB node 3 are parent nodes of an IAB node 4, and a parent node of an IAB node 5 is the IAB node 3. An uplink data packet of a terminal may be transmitted to the donor node through one or more IAB nodes, and then the donor node sends the uplink data packet to a mobile gateway device (for example, a user plane function (UPF) network element in a 5G network). After receiving a downlink data packet from the mobile gateway device, the donor node sends the downlink data packet to the terminal through the one or more IAB nodes. There are two available paths for data packet transmission between a terminal 1 and the donor node: the terminal 1→the IAB node 4→the IAB node 3→the IAB node 1→the donor node, and the terminal 1→the IAB node 4→the IAB node 2→the IAB node 1→the donor node. There are three available paths for data packet transmission between a terminal 2 and the donor node: the terminal 2→the IAB node 4→the IAB node 3→the IAB node 1→the donor node, the terminal 2→the IAB node 4→the IAB node 2→the IAB node 1→the donor node, and the terminal 2→the IAB node 5→the IAB node 2→the IAB node 1→the donor node.

It may be understood that, in the IAB network, one transmission path between the terminal and the donor node may include one or more IAB nodes. Each IAB node needs to maintain a wireless backhaul link to a parent node, and further needs to maintain a wireless link to a child node. If one IAB node is a node accessed by the terminal, a wireless access link exists between the IAB node and a child node (namely, the terminal). If one IAB node is a node that provides a backhaul traffic for another IAB node, a wireless backhaul link exists between the IAB node and a child node (namely, the another IAB node). For example, referring to FIG. 1, in the path "the terminal 1→the IAB node 4→the IAB node 3→the IAB node 1→the donor node", the terminal 1 accesses the IAB node 4 through a wireless access link, the IAB node 4 accesses the IAB node 3 through a wireless backhaul link, the IAB node 3 accesses the IAB node 1 through a wireless backhaul link, and the IAB node 1 accesses the donor node through a wireless backhaul link.

The foregoing IAB networking scenario is merely an example. In an IAB scenario in which multi-hop and multi-connectivity are combined, there are more other possibilities of the IAB networking scenario. For example, a donor node and an IAB node connected to another donor node form dual connectivity to serve a terminal. The possibilities are not listed one by one herein.

In the embodiments of this application, an access IAB node is an IAB node accessed by a terminal, and an intermediate IAB node is an IAB node that provides a wireless backhaul traffic for an IAB node (for example, an access IAB node or another intermediate IAB node). For example, referring to FIG. 1A, in the path "the terminal 1→the IAB node 4→the IAB node 3→the IAB node 1→the donor node", the IAB node 4 is an access IAB node, and the IAB node 3 and the IAB node 1 are intermediate IAB nodes. It should be noted that, an IAB node is an access IAB node for a terminal that accesses the IAB node. An IAB node is an intermediate IAB node for a terminal that accesses another IAB node. Therefore, whether an IAB node is specifically an access IAB node or an intermediate IAB node is not fixed, and needs to be determined based on a specific application scenario.

Figure 1B:
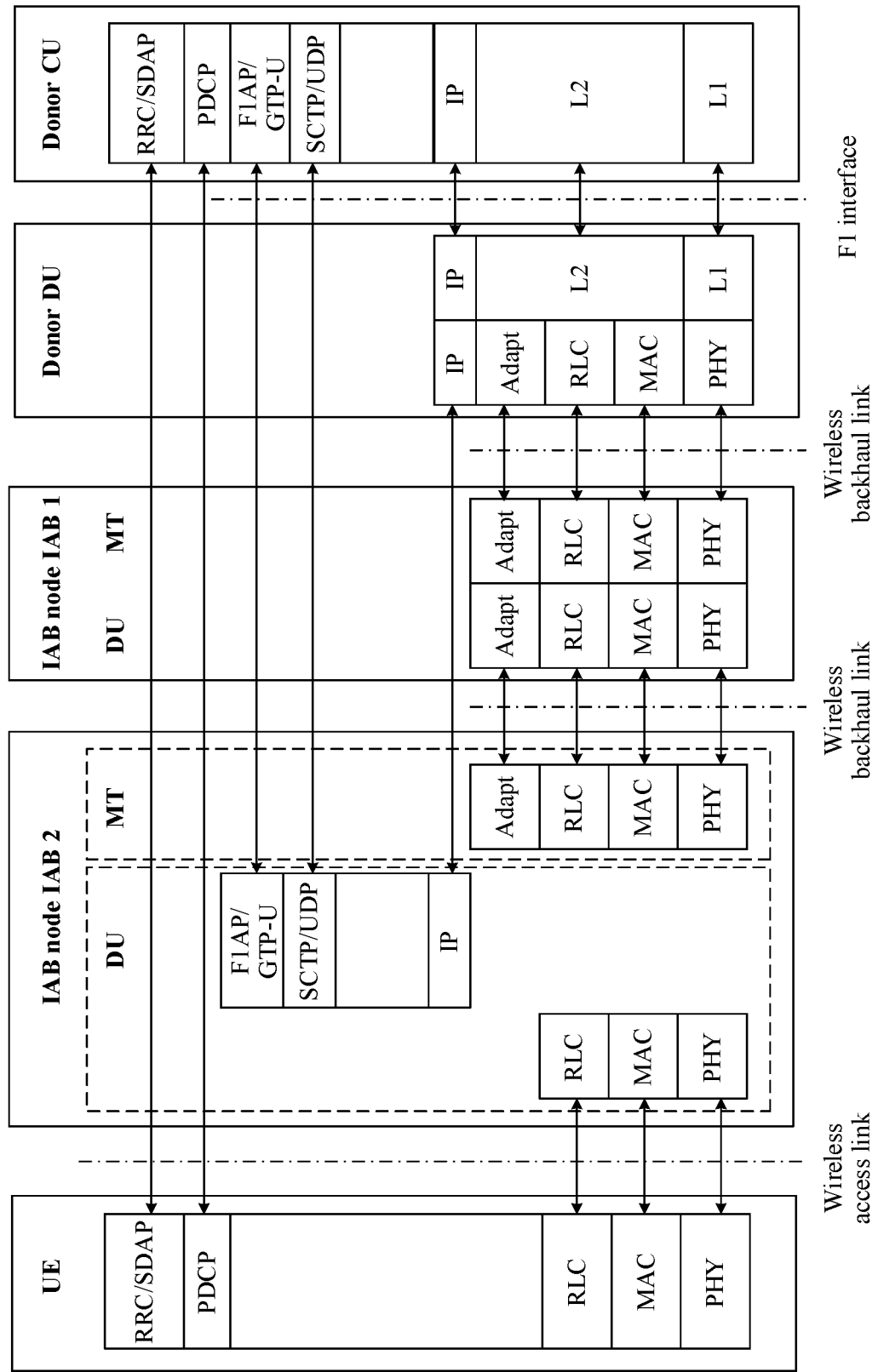
FIG. 1B is a schematic diagram of a possible communication system according to this application.

FIG. 1B is a schematic block diagram 100B applicable to an embodiment of this application. The following specifically describes the embodiments of this application with reference to FIG. 1B. For example, 100B corresponding to FIG. 1B may include user equipment UE, IAB nodes (an IAB 1 and an IAB 2), a donor DU, and a donor CU.

FIG. 1B may be a schematic diagram of a protocol stack when a service of the user equipment UE is transmitted in an IAB network. A user plane of the UE may include a physical (PHY) layer function, a media access control (MAC) layer function, a radio link control (RLC) layer function, a packet data convergence protocol (PDCP) layer function, and a service data adaptation protocol (SDAP) layer function. A control plane of the UE may include a PHY layer function, a MAC layer function, an RLC layer function, a PDCP layer function, a radio resource control (RRC) layer function, and the like.

For the UE, the IAB 1 may be referred to as an intermediate IAB node, and either of a control plane and a user plane of the IAB 1 may include a DU and a mobile terminal (MT). Each of the DU and the MT may include a PHY layer function, a MAC layer function, an RLC layer function, and an adaptation layer (Adapt) function.

For the UE, the IAB 2 may be referred to as an access IAB node, and either of a control plane and a user plane of the IAB 2 may include a DU and an MT. The MT of either of the control plane and the user plane of the IAB 2 node may include a PHY layer function, a MAC layer function, an RLC layer function, and an Adapt layer function. The DU of the user plane of the IAB node 2 may include a PHY layer function, a MAC layer function, an RLC layer function, and an internet protocol (IP) layer function, a user datagram protocol (UDP) layer function, and a GPRS tunneling protocol-user plane (GTP-U) layer function on an F1 interface facing a donor node or the donor CU. The DU of the control plane of the IAB 2 node may include a PHY layer function, a MAC layer function, an RLC layer function, and an IP layer function, a stream control transmission protocol (CTP) layer function, and an F1 application protocol (FLAP) layer function on the F1 interface.

The donor DU may include a PHY layer function, a MAC layer function, an RLC layer function, and an Adapt layer function.

A user plane of the donor CU may include an IP layer function, a UDP layer function, and a GTP-U layer function of an F1 interface facing the IAB 2, a PDCP layer function, and an SDAP layer function. A control plane of the donor CU may include an IP layer function, an SCTP layer function, and an F1AP layer function of the F1 interface facing the IAB 2. Optionally, if security protection is considered for the F1 interface between the DU of the IAB node and the donor CU, a protocol layer of the F1 interface on the IAB node may further include an IPsec layer, a PDCP layer, or a DTLS (datagram transport layer security) layer. The protocol layer for security protection is not shown in FIG. 1B or 1C.

In this application, an F1AP message or a V1AP message may be used for interaction between the CU and the DU (for example, the donor-DU or the DU of the IAB node). For example, an existing FLAP message may be a gNB-CU/gNB-DU configuration update message, a gNB-CU/gNB-DU configuration update acknowledge message, a UE context setup/modification request (user equipment context setup/modification request) message, a UE context setup/modification response (user equipment context setup/modification response) message, a UE context setup/modification required (user equipment context setup/modification required) message, or a UE context release command/request/complete message.

Figure 1C:
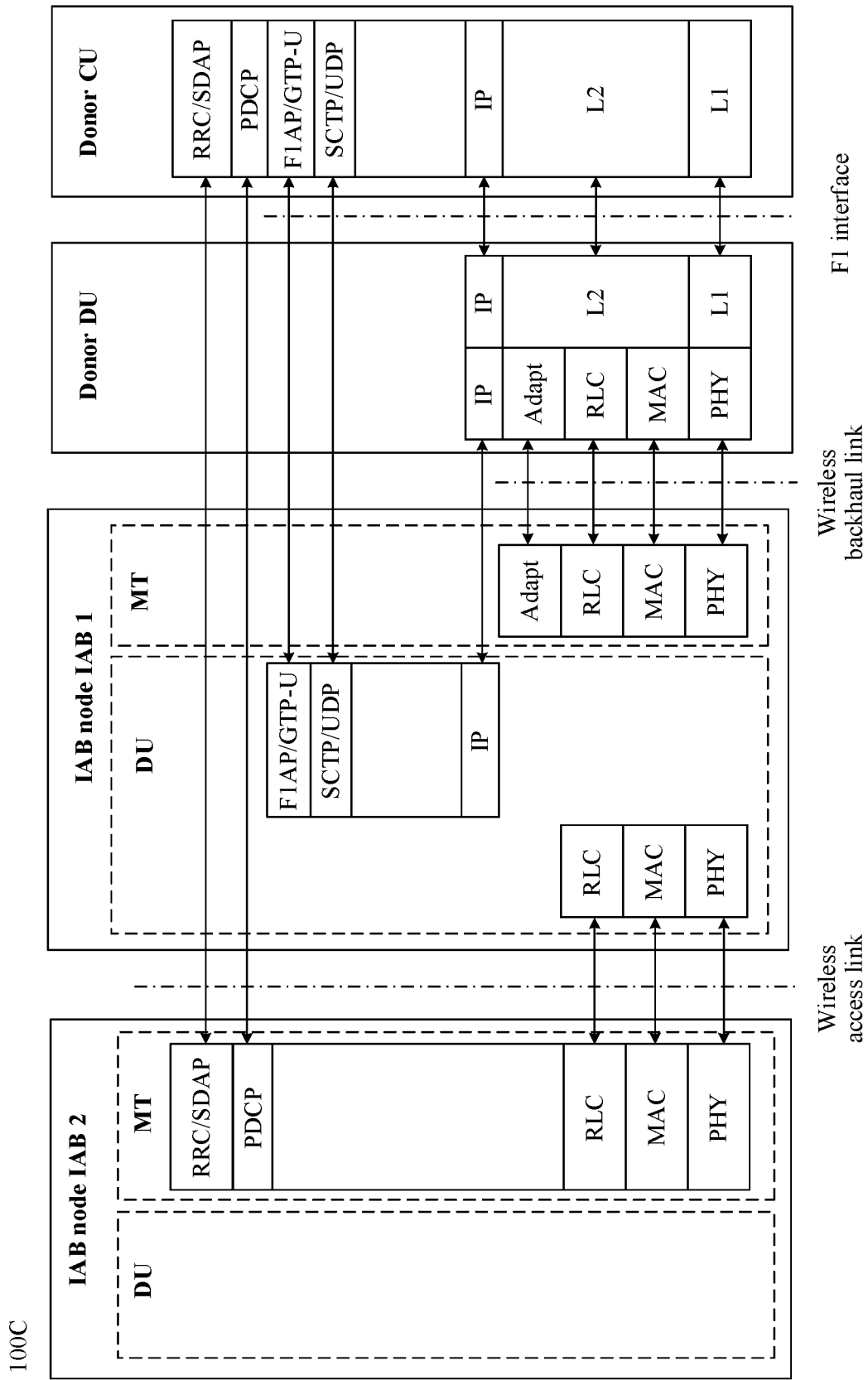
FIG. 1C is a schematic diagram of a possible communication system according to this application.

FIG. 1C is a schematic block diagram 100C applicable to an embodiment of this application. The following specifically describes the embodiments of this application with reference to FIG. 1C. For example, 100C corresponding to FIG. 1C may include IAB nodes (an IAB 1 and an IAB 2), a donor DU, and a donor CU.

FIG. 1C may be a schematic diagram of a protocol stack when an access traffic of an MT of the IAB node 2 is transmitted in an IAB network. The IAB 2 node may include a DU and an MT. The MT of a user plane of the IAB 2 node may include a PHY layer function, a MAC layer function, an RLC layer function, a PDCP layer function, and an SDAP layer function. The MT of a control plane of the IAB 2 node may include a PHY layer function, a MAC layer function, an RLC layer function, a PDCP layer function, a radio resource control (RRC) layer function, and the like.

Either of MTs of a user plane and a control plane of the IAB 1 node may include a PHY layer function, a MAC layer function, an RLC layer function, and an Adapt layer function. A DU of the user plane of the IAB 1 node may include a PHY layer function, a MAC layer function, an RLC layer function, and an internet protocol (IP) layer function, a user datagram protocol (UDP) layer function, and a GTP-U layer function on an F1 interface facing a donor node or the CU. A DU of the control plane of the IAB 1 node may include a PHY layer function, a MAC layer function, an RLC layer function, and an IP layer function, a stream control transmission protocol (SCTP) layer function, and an F1 application protocol (F1AP) layer function on the F1 interface facing the donor node or the CU.

For example, for explanations of an access traffic and a backhaul traffic of an IAB node in this application, refer to the following descriptions. A service of user equipment UE (including user plane service data/signaling and control plane service data/signaling of the UE) connected to an IAB node needs to be transmitted to a donor node via at least one wireless backhaul link. An access IAB node that provides an access traffic for the UE may regard the service as the access service, and an intermediate IAB node in an IAB network may regard the service as a backhaul service. In addition, a service terminated at a DU of the IAB node, for example, an F1AP message that is between the IAB-DU and a CU and that is used to configure the DU of the IAB node, may also be considered as the backhaul traffic. For example, if an IAB node that receives an uplink service data packet on a wireless backhaul link needs to transfer the uplink service data packet to an F1 interface protocol layer of a DU of the IAB node for processing, the uplink service data packet may be referred to as an access traffic of the IAB node; or if an IAB node that receives an uplink service data packet on a wireless backhaul link needs to transfer the uplink service data packet to an Adapt layer of a DU of the IAB node for processing, the uplink service data packet may also be referred to as a backhaul traffic of the IAB node. For example, if an IAB node that receives a downlink service data packet on a wireless backhaul link needs to transfer the downlink service data packet to a PDCP layer of an MT of the IAB node for processing, the downlink service data packet may be referred to as an access traffic of the IAB node; or if an IAB node that receives a downlink service data packet on a wireless backhaul link needs to transfer the downlink service data packet to an Adapt layer of an MT of the IAB node for processing, the downlink service data packet may be referred to as a backhaul traffic of the IAB node.

The access traffic in this application may be an access traffic of a terminal device, for example, a service that starts from or terminated at the terminal device on a wireless access link, and includes user plane service data/signaling and control plane service data/signaling between the terminal device and a donor node. For an IAB node accessed by a terminal, a service of the terminal on a wireless link to the terminal is an access traffic. The access traffic of the terminal needs to be transmitted on a wireless backhaul link (which is a backhaul link between an IAB node and a base station or between two IABs). Therefore, the service of the terminal on the wireless backhaul link is considered as a backhaul traffic. The access traffic in this application may also be an MT access traffic of an IAB node. An MT of the IAB node may access a network in a manner used by a terminal, and set up a session (PDU session) with a core network to transmit MT service data. This type of service data originates from or terminates at the MT of the IAB node. Therefore, the service may also be referred to as an MT access-related service. For example, the MT may set up the session with the core network to connect to an operation, administration, and maintenance (OAM) network element, and then download a necessary configuration message required by the IAB node from the OAM network element. A service used by the MT to download the configuration message from the OAM network element is the MT access traffic, and the MT access traffic needs to be transmitted on a wireless backhaul link (which is a backhaul link between an IAB node and a base station or between two IABs).

The backhaul traffic in this application may be a backhaul traffic of a terminal device. For example, the backhaul traffic in this application may include: On a wireless backhaul link between an IAB node and a parent node, data of a terminal may be considered as a backhaul service for the IAB node. The terminal may be a terminal accessing the IAB node, or may be a terminal accessing a child node of the IAB node, or may be a terminal accessing a secondary child node (namely, a node indirectly connected to the IAB node through at least two wireless links and connected to a donor base station through the IAB node) of the IAB node. In addition, a service terminated at a DU of the IAB node, for example, an F1AP message between the DU of the IAB node and a CU of a donor node, may also be considered as a backhaul traffic. The backhaul traffic in this application may alternatively be a backhaul traffic of an MT of an IAB node. Optionally, when an IAB node performs an MT access traffic, the IAB node or an MT of the IAB node may also be considered by a parent node (or an upper-level node) as a terminal accessing the parent node, and on a wireless backhaul link between the parent node of the IAB node and a parent node of the parent node, data of the IAB node may also be considered by the parent node of the IAB node as a backhaul traffic. The backhaul traffic needs to be transmitted on a wireless backhaul link (which is a backhaul link between an IAB node and a base station or between two IABs).

In this application, when a function of configuring an IAB node by a donor node is involved, the donor node may be equivalent to a donor CU (or a CU-CP).

In this application, an upper protocol layer of an RLC layer may be an upper protocol layer that is adjacent to the RLC layer and that has a service access point (SAP) (or referred to as a service interface). For example, when performing receiving processing as a receive end, an RLC layer entity delivers data to an upper protocol layer entity of the RLC layer after completing processing on a received data packet, and the upper protocol layer entity of the RLC layer continues to perform receiving processing. Alternatively, when performing sending processing as a transmit end, an RLC layer entity first receives a data packet sent after an upper protocol layer entity of the RLC layer performs sending processing, and the RLC layer continues to perform sending processing. For example, when an IAB node transmits a backhaul traffic, an upper protocol layer of an RLC layer is an Adapt layer on a wireless link to a parent node of the IAB node; or when an IAB node transmits an access traffic of the IAB node, an upper protocol layer of an RLC layer is a PDCP layer on a wireless link to a parent node of the IAB node.

Optionally, in this application, the upper protocol layer of the RLC layer may further be a transmit-side protocol layer to which the RLC layer entity, serving as the receive end, delivers the data packet after performing receiving processing, or a receive-side protocol layer that delivers the data packet to the RLC layer entity serving as a transmit side. For example, an F1AP layer or a GTP-U layer of an access IAB node, serving as an F1 interface protocol layer, may be considered as an upper protocol layer of an RLC layer of an access link between the access IAB node and a child node of the access IAB node. For example, in FIG. 1B, upper protocol layers of RLC layers of the MT and the DU of the IAB 1 are both adaptation Adapt layers. In FIG. 1C, an upper protocol layer of an RLC layer of the MT of the IAB 1 is a PDCP layer, and an upper protocol layer of an RLC layer of the DU of the IAB 2 is an F1 interface protocol layer, for example, an F1AP layer or a GTP-U layer.

The IAB node in FIG. 1C is used as an example. An upper protocol layer of an RLC layer of the IAB 2 is a PDCP layer, an upper protocol layer of an RLC layer of the DU of the IAB 1 is an F1 interface protocol layer, and an upper protocol layer of an RLC layer of the MT of the IAB 1 is an Adapt layer.

Configurations of an RLC bearer of an IAB node in this application may be configurations of an RLC layer and a MAC layer corresponding to a radio bearer (RB), and may specifically include configurations of an RLC layer entity and a MAC layer logical channel (LCH). In this application, a logical channel is a channel between the MAC layer and the RLC layer, and may also be referred to as the MAC layer logical channel.

An RLC bearer of an IAB node may be configured by a donor node by sending configuration information to the IAB node. For example, the configuration information may be an RRC message (for example, an RRC reconfiguration message sent by the donor node to an MT of the IAB node). RLC bearer configuration information (for example, the information may be referred to as or include an RLC-BearerConfig information element) is carried in the RRC message to configure the RLC bearer of the IAB node.

For example, an RLC bearer 1 includes an RLC layer entity 1 and an LCH 1, an RLC bearer 2 includes an RLC layer entity 2 and an LCH 2, . . . , and an RLC bearer N includes an RLC layer entity N and an LCH N. The MAC layer logical channel LCH may be identified by using an LCID. Optionally, the RLC layer entity may be identified by using an RLC layer entity identifier, and the RLC bearer may be identified by using an RLC bearer identifier.

In this application, on a link between the IAB node and a parent node of the IAB node, RLC bearers used to carry an access traffic and a backhaul traffic may be or may not be independent of each other.

Optionally, on the link between the IAB node and the parent node of the IAB node, the RLC bearers used to carry the access traffic and the backhaul traffic may be independent of each other, and each RLC bearer includes one logical channel (LCH). In addition, different RLC bearers include different LCHs, and logical channels carrying the access traffic and the backhaul traffic on the link between the IAB node and the parent node of the IAB node are also different.

Optionally, on the link between the IAB node and the parent node of the IAB node, the RLC bearers used to carry the access traffic and the backhaul traffic are not independent of each other, that is, the RLC bearer used to carry the access traffic and the RLC bearer used to carry the backhaul traffic may be a same RLC bearer. If each RLC bearer includes one logical channel (LCH) and different RLC bearers include different LCHs, on the link between the IAB node and the parent node of the IAB node, logical channels carrying the access traffic and the backhaul traffic may also be a same logical channel.

Figure 2:
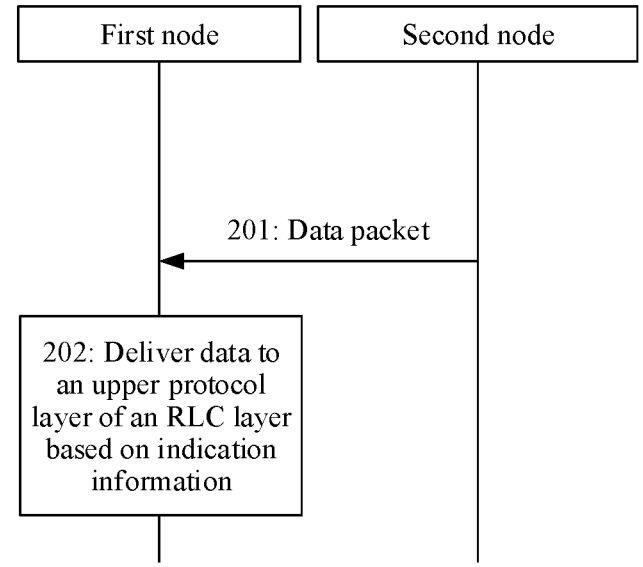
FIG. 2 is a schematic flowchart of a communication method according to an embodiment of this application.

FIG. 2 is a schematic flowchart of a communication method according to this application. The following specifically describes the technical solutions in the embodiments of this application with reference to FIG. 2. For example, the communication method 200 corresponding to FIG. 2 may include the following steps.

Operation 201: A first node receives a data packet from a second node.

Each of the first node and the second node is a node in wireless relay communication, and may be a donor node, a donor DU, an intermediate IAB node that plays a wireless backhaul role, or an access IAB node that provides a wireless access traffic.

For example, the data packet may include data and a protocol layer header, and the data may be an actual payload of data transmission between the nodes. In this application, the actual payload of the data transmission between the nodes may be understood as meaningful information other than the protocol layer header from the data packet. The data packet may be an uplink data packet between the nodes, or may be a downlink data packet between the nodes.

Optionally, the protocol layer header may include a media access control MAC header. The MAC header includes first indication information, and the first indication information includes a logical channel identity (LCID) corresponding to the data packet.

Optionally, the protocol layer header may include a radio link control RLC header. The RLC header includes second indication information, and the second indication information includes indication information of an access traffic or indication information of a backhaul traffic.

Optionally, before or after the operation 201, the method may further include: receiving, by the first node, third indication information, where the third indication information indicates a correspondence between an RLC layer entity and an upper protocol layer entity of an RLC layer of the first node. The third indication information may be sent by a donor node to the first node. The third indication information may be an information element included in configuration information sent by the donor node to the IAB node, for example, an information element in RLC bearer configuration information (for example, the information may be referred to as or include an RLC-BearerConfig information element). The information element indicates that the upper protocol layer entity that is of the RLC layer and that corresponds to the RLC layer entity of the first node is a PDCP layer entity or an Adapt layer entity; or the information element may indicate that the upper protocol layer entity that is of the RLC layer and that corresponds to the RLC layer entity of the first node is a PDCP entity, an F1 interface protocol layer entity, or an Adapt layer entity.

For example, an upper protocol layer of an RLC layer may include any one of the following: a packet data convergence protocol PDCP layer, an adaptation Adapt layer, or an F1 interface protocol layer.

The correspondence may be shown in Table 1.

| Identifier of the RLC layer entity | Upper protocol layer entity of the RLC layer |
|---|---|
| 1 | First PDCP layer entity |
| 2 | First Adapt layer entity |
| 3 | First F1 interface protocol layer entity |
| ... | ... |
| N | $M^{th}$ F1 interface protocol layer entity |
| N + 1 | $M^{th}$ Adapt layer entity |
| N + 2 | $M^{th}$ PDCP layer entity |

For example, the first PDCP layer entity and the $M^{th}$ PDCP layer entity in Table 1 may be a same PDCP layer entity. For example, the IAB node includes only one PDCP layer entity. Alternatively, the first PDCP layer entity and the $M^{th}$ PDCP layer entity in Table 1 may be different PDCP layer entities. For example, the IAB node includes a plurality of PDCP layer entities. The first Adapt layer entity and the $M^{th}$ Adapt layer entity in Table 1 may be a same Adapt layer entity. For example, the IAB node includes only one Adapt layer entity. Alternatively, the first Adapt layer entity and the $M^{th}$ Adapt layer entity in Table 1 may be different Adapt layer entities. For example, the IAB node includes a plurality of Adapt layer entities. The first F1 interface protocol layer entity and the $M^{th}$ F1 interface protocol layer entity in Table 1 may be a same F1 interface protocol layer entity. For example, the IAB node includes only one F1 interface protocol layer entity. Alternatively, the first F1 interface protocol layer entity and the $M^{th}$ F1 interface protocol layer entity in Table 1 may be different F1 interface protocol layer entities. For example, the IAB node includes a plurality of F1 interface protocol layer entities.

It should be noted that Table 1 shows only a possible correspondence between the RLC layer entity and the upper protocol layer entity of the RLC layer. The correspondence is not limited to the form shown in Table 1. This is not limited in this application. For example, when both the first node and the donor node store content shown in Table 1, the third indication information may indicate the correspondence in a form of a bit string, a sequence, or a bitmap (bit map). For example, "0000" is used to indicate the first row in Table 1, . . . , "0111" is used to indicate the eighth row in Table 1, and so on. According to this design, example beneficial effects include: In this way, content included in the third indication information can be flexibly configured, or signaling overheads can be controlled.

Operation 202: The first node delivers the data to the upper protocol layer of the RLC layer of the first node based on the indication information.

On one hand, the MAC header of the data packet may include the first indication information, and the first indication information includes the LCID. In this case, the first node delivers the data to the upper protocol layer of the RLC layer based on the LCID and a correspondence between the LCID and the upper protocol layer of the RLC layer.

If the LCID corresponds to an F1 interface protocol layer of a DU of the first node, the data needs to be delivered to the F1 interface protocol layer of the DU of the first node. If the LCID corresponds to a PDCP layer of an MT of the first node, the data needs to be delivered to the PDCP layer of the MT of the first node. If the LCID corresponds to an Adapt layer of a DU of the first node, the data needs to be delivered to the Adapt layer of the DU of the first node. If the LCID corresponds to an Adapt layer of an MT of the first node, the data needs to be delivered to the Adapt layer of the MT of the first node.

For example, the first node receives information from the donor node, and the first node obtains the correspondence between the LCID and the upper protocol layer of the RLC layer based on the information. Optionally, the first node stores the information, and the first node obtains the correspondence between the LCID and the upper protocol layer of the RLC layer based on the information.

Optionally, the information includes information about a first group of LCIDs and/or information about a second group of LCIDs, the first group of LCIDs includes an LCID used for the access traffic, and the second group of LCIDs includes an LCID used for the backhaul traffic. If the LCID belongs to the first group of LCIDs, and the data packet received by the first node is an uplink data packet, the LCID corresponds to the F1 interface protocol layer of the DU of the first node. Alternatively, if the LCID belongs to the first group of LCIDs, and the data packet received by the first node is a downlink data packet, the LCID corresponds to the PDCP layer of the MT of the first node. If the LCID belongs to the second group of LCIDs, and the data packet received by the first node is an uplink data packet, the LCID corresponds to the Adapt layer of the DU of the first node. Alternatively, if the LCID belongs to the second group of LCIDs, and the data packet received by the first node is a downlink data packet, the LCID corresponds to the Adapt layer of the MT of the first node.

Optionally, the information is RLC bearer configuration information that is of the first node and that is used to set up a logical channel, and an RLC bearer includes a logical channel indicated by the LCID. If the information includes a radio bearer identifier, and the data packet received by the first node is an uplink data packet, the LCID corresponds to the F1 interface protocol layer of the DU of the first node. Alternatively, if the information includes a radio bearer identifier, and the data packet received by the first node is a downlink data packet, the LCID corresponds to the PDCP layer of the MT of the first node. If the information does not include a radio bearer identifier, and the data packet received by the first node is an uplink data packet, the LCID corresponds to the Adapt layer of the DU of the first node. Alternatively, if the information does not include a radio bearer identifier, and the data packet received by the first node is a downlink data packet, the LCID corresponds to the Adapt layer of the MT of the first node.

Optionally, the information is RLC bearer configuration information that is of the first node and that is used to set up a logical channel, an RLC bearer includes a logical channel indicated by the LCID, the information includes indication information, and values of the indication information include a first value and a second value. If the value of the indication information is the first value, and the data packet received by the first node is an uplink data packet, the LCID corresponds to the F1 interface protocol layer of the DU of the first node. Alternatively, if the value of the indication information is the first value, and the data packet received by the first node is a downlink data packet, the LCID corresponds to the PDCP layer of the MT of the first node. If the value of the indication information is the second value, and the data packet received by the first node is an uplink data packet, the LCID corresponds to the Adapt layer of the DU of the first node. Alternatively, if the value of the indication information is the second value, and the data packet received by the first node is a downlink data packet, the LCID corresponds to the Adapt layer of the MT of the first node.

For example, the indication information may be in a form of a bitmap or a sequence. For example, the first value is 010, and the second value is 101.

On the other hand, the RLC header of the data packet may include the second indication information. If the second indication information includes the indication information of the access traffic, and the data packet received by the first node is an uplink data packet, the data needs to be delivered to the F1 interface protocol layer of the DU of the first node. Alternatively, if the second indication information includes the indication information of the access traffic, and the data packet received by the first node is a downlink data packet, the data needs to be delivered to the PDCP layer of the MT of the first node. If the second indication information includes the indication information of the backhaul traffic, and the data packet received by the first node is an uplink data packet, the data needs to be delivered to the Adapt layer of the DU of the first node. Alternatively, if the second indication information includes the indication information of the backhaul traffic, and the data packet received by the first node is a downlink data packet, the data needs to be delivered to the Adapt layer of the MT of the first node. For example, values of the second indication information may include a first value and a second value. If the value of the indication information is the first value, the second indication information indicates the access traffic. If the value of the second indication information is the second value, the second indication information indicates the backhaul traffic. For example, the second indication information may be in a form of a bitmap or a sequence. For example, the first value is 010, and the second value is 101.

On the other hand, the first node receives the third indication information, and the first node configures the correspondence between the RLC layer entity and the upper protocol layer entity of the RLC layer of the first node based on the third indication information. The first node receives the data by using the RLC layer entity. If the third indication information indicates that the RLC layer entity corresponds to a PDCP layer entity or an F1 interface protocol layer entity, the first node delivers the data to the PDCP layer or the F1 interface protocol layer of the first node. If the third indication information indicates that the RLC layer entity corresponds to an Adapt layer entity, the first node delivers the data to the Adapt layer of the first node.

It should be noted that, for simplicity and unification, the F1 interface protocol layer is also referred to as the upper protocol layer of the RLC layer in this application, and a channel between the RLC layer and the F1 interface protocol layer is also referred to as an RLC channel in this application. Optionally, if the upper protocol layer of the RLC layer does not include the F1 interface protocol layer, the operation 202 is correspondingly modified to be that the first node delivers the data to the upper protocol layer of the RLC layer or the F1 interface protocol layer of the first node based on the first indication information or the second indication information. A corresponding part in this embodiment also needs to be modified accordingly, and details are not described herein again. Optionally, if the RLC channel does not include the channel between the RLC layer and the F1 interface protocol layer, a type of the data may be classified based on an RLC channel from which the data comes or the channel between the RLC layer and the F1 interface protocol layer. A corresponding part in this embodiment also needs to be modified accordingly, and details are not described herein again.

With reference to descriptions of the method 200 in this embodiment, the following specifically describes a process in which an IAB node processes a data packet in combination with the protocol stack structures of the IAB network shown in FIG. 1B and FIG. 1C.

Configuration of an RLC Bearer of an MT of the IAB Node:

Specifically, an RLC layer entity of the MT of the IAB node is classified into two types: One type is configured to transmit a backhaul traffic, and associates an adaptation layer entity with an upper layer. The other type is used to transmit an MT access traffic, and associate a PDCP layer entity with an upper layer. In this application, that the RLC layer entity associates an X layer entity with the upper layer means that an upper protocol layer of an RLC layer is an X layer.

Therefore, when an RLC layer of the MT of the IAB node is configured, for example, an RRC message sent by a donor node to the MT includes a cell group-related configuration (CellGroupConfig) information element, and the information element includes a part related to the configuration of the RLC bearer. Configuration differences between the two types of RLC layer entities may be reflected as that specifically, indication information may be included in an information element (for example, RLC-BearerConfig) used to configure the RLC bearer, to indicate whether the upper layer of the RLC layer entity is associated with the PDCP entity or the Adapt entity. In a possible manner, after the information element (for example, the RLC-BearerConfig) that is sent to the MT and that is used to configure the RLC bearer is generated by a DU of a parent node, the information element is sent to the donor node, and then the donor node includes the information element in the RRC message sent to the MT of the IAB node.

The indication information may be explicitly carried in a message for configuring the RLC bearer. For example, the RLC-BearerConfig information element sent to the MT of the IAB node includes an indication information element, and the indication information element has two values (for example, 0 and 1). The value 1 indicates that the RLC layer entity associates the Adapt entity with the upper layer, and the value 2 indicates that the RLC layer entity associates the PDCP entity with the upper layer.

Alternatively, the indication information may be implicitly carried. For example, for an RLC bearer used to carry the MT access traffic (where the RLC layer entity corresponding to the RLC bearer associates the PDCP layer entity with the upper layer). When a logical channel of the RLC bearer is set up, the RLC-BearerConfig information element carries a radio bearer identifier (for example, a data radio bearer identifier DRB ID or a signaling radio bearer identifier SRB ID). For an RLC bearer used to carry the backhaul traffic (where the RLC layer entity corresponding to the RLC bearer associates the Adapt layer entity with the upper layer). When a logical channel of the RLC bearer is set up, the RLC-BearerConfig information element used to configure the RLC layer entity does not carry a radio bearer identifier. Therefore, when a logical channel of an RLC bearer is set up, whether the logical channel includes a radio bearer identifier may indicate whether the RLC bearer is used to carry the MT access traffic (where the RLC layer entity corresponding to the RLC bearer associates the PDCP layer entity with the upper layer) or the backhaul traffic (where the RLC layer entity corresponding to the RLC bearer associates the Adapt layer entity with the upper layer).

In still another example in which the indication information is implicitly carried, in the RLC-BearerConfig information element, an LCID of a logical channel corresponding to the RLC bearer may be used to implicitly indicate that the RLC bearer is used to carry the MT access traffic or is used to carry the backhaul traffic. That is, if the LCID falls within an LCID value range corresponding to the MT access traffic, it indicates that the RLC bearer is used to carry the MT access traffic (where the RLC layer entity corresponding to the RLC bearer associates the PDCP layer entity with the upper layer). If the LCID falls within an LCID value range corresponding to the backhaul traffic, it indicates that the RLC bearer is used to carry the backhaul traffic (where the RLC layer entity corresponding to the RLC bearer associates the Adapt layer entity with the upper layer). This manner depends on that a pre-divided LCID range corresponds to the backhaul traffic or the access traffic (MT access traffic) of the IAB node. For details, refer to descriptions in the following paragraph.

The DU of the parent node of the IAB node configures a plurality of logical channels for a wireless link between the IAB node and the parent node, and allocates a corresponding logical channel identity LCID to each logical channel. To help the MT of the IAB node distinguish whether a type of a traffic carried on each logical channel is the MT access traffic or the backhaul traffic, a relatively simple manner is that when the DU of the parent node allocates the logical channel identity to the MT of the IAB node, an LCID value range (LCID space) is divided, a part obtained through the division is used to serve the MT access traffic of the IAB node, and the other part is used to serve the backhaul traffic of the IAB node. For example, if the LCID value range (converted into decimal) of the IAB node on a backhaul link is [0, 63], a part of LCIDs in a range of [0, 7] are obtained through division and allocated to a logical channel used to serve the MT access traffic, and a remaining part of LCIDs in a range of [8, 63] are allocated to a logical channel used to serve the backhaul traffic. A specific division manner of the LCID value range may directly use a fixed division manner. Alternatively, if the division manner can be flexible, the donor node (or a CU, or a CU-CP) may further notify the division manner to the MT of the IAB node by using an RRC message, or notify the division manner to the DU of the parent node of the IAB node by using an F1AP message.

Configuration of an RLC Bearer of a DU of the IAB Node:

A donor node may send configuration information to the IAB node, to indicate the IAB node to set up an RLC bearer between the IAB node and a child node of the IAB node, and include indication information in the configuration information, to indicate whether the RLC bearer is used to serve a backhaul traffic or an access traffic of the child node. For example, the configuration information is an F1AP message sent by the donor node to the DU of the IAB node.

Processing on a Received Data Packet by the IAB Node:

For downlink transmission, when the MT of the IAB 2 receives a downlink data packet, a MAC header in the downlink data packet includes first indication information, namely, a logical channel identity LCID included in the data packet. Before receiving the downlink data packet, the IAB 2 receives configuration information that is of an RLC bearer of the MT from a donor node and that includes the LCID, and the IAB determines, based on the configuration information, whether the RLC bearer is used for an access traffic or a backhaul traffic. If the RLC bearer is used for the access traffic, an RLC layer entity of the RLC bearer associates a PDCP layer entity with an upper layer. If the RLC bearer is used for the backhaul traffic, an RLC layer entity of the RLC bearer associates an Adapt layer entity with an upper layer. Therefore, the IAB 2 may determine, based on the LCID included in the data packet, whether the RLC bearer for receiving the downlink data packet is used for the access traffic or the backhaul traffic. If it is determined that the RLC bearer of the IAB 2 is an RLC bearer used for the access traffic, the IAB 2 delivers data to a PDCP layer. If it is determined that the RLC bearer of the IAB 2 is an RLC bearer used for the backhaul traffic, the IAB 2 delivers data to an Adapt layer. For uplink transmission, when the DU of the IAB 2 receives an uplink data packet, a MAC header in the uplink data packet includes first indication information, namely, a logical channel identity LCID included in the data packet. The IAB 2 may determine, based on the LCID, a corresponding RLC bearer for receiving the uplink data packet and an RLC layer entity corresponding to the RLC bearer. The IAB 2 determines, based on configuration information of the RLC bearer previously sent by the donor node, whether the RLC bearer for receiving the uplink data packet is used for the access traffic or the backhaul traffic. If it is determined that the RLC bearer is an RLC bearer for the access traffic, the IAB 2 delivers data to an F1 interface protocol layer. If it is determined that the RLC bearer is an RLC bearer for the backhaul traffic, the IAB 2 delivers data to an Adapt layer.

For downlink transmission, when the RLC layer entity of the MT of the IAB 2 receives a downlink data packet, if second indication information in an RLC header of the downlink data packet indicates that data is the access traffic, the IAB 2 delivers the data to the PDCP layer, or if second indication information indicates that data is the backhaul traffic, the IAB 2 delivers the data to the Adapt layer.

For uplink transmission, when the RLC layer entity of the DU of the IAB 2 receives an uplink data packet, if second indication information in an RLC header of the uplink data packet indicates that data is the access traffic, the IAB 2 delivers the data to the F1 interface layer, or if second indication information indicates that data is the backhaul traffic, the IAB 2 delivers the data to the Adapt layer.

For downlink transmission, when the RLC layer entity of the MT of the IAB 2 receives a downlink data packet, if an upper protocol layer entity of the RLC layer entity is a PDCP layer entity based on third indication information previously received by the IAB 2, the IAB 2 delivers data to the PDCP layer; or if an upper protocol layer entity of the RLC layer entity is an Adapt layer entity based on third indication information previously received by the IAB 2, the IAB 2 delivers data to the Adapt layer.

Figure 3:
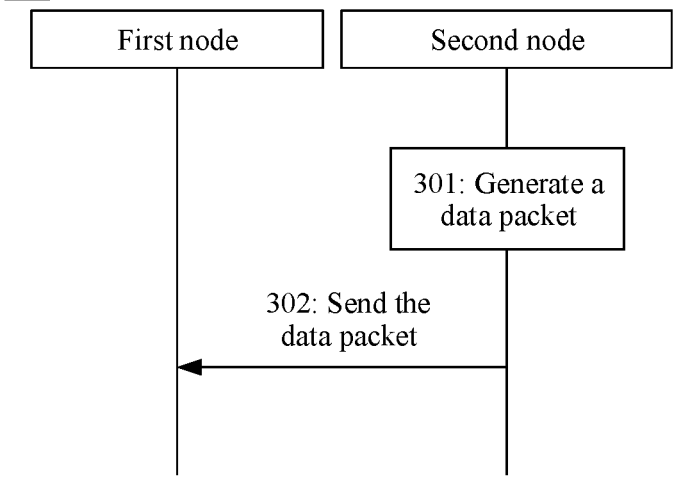
FIG. 3 is a schematic flowchart of a communication method according to an embodiment of this application.

For uplink transmission, when the RLC layer entity of the DU of the IAB 2 receives an uplink data packet, if an upper protocol layer entity of the RLC layer entity is an F1 interface layer based on third indication information previously received by the IAB 2, the IAB 2 delivers data to the F1 interface layer; or if an upper protocol layer entity of the RLC layer entity is an Adapt layer based on third indication information previously received by the IAB 2, the IAB 2 delivers data to the Adapt layer. FIG. 3 is a schematic flowchart of a communication method according to this application. The following specifically describes the technical solutions in the embodiments of this application with reference to FIG. 3. For example, the communication method 300 corresponding to FIG. 3 may include the following steps.

Operation 301: A second node generates a data packet.

For example, the data packet may include data and a protocol layer header, and the data may be an actual payload of data transmission between nodes. In this application, the actual payload of the data transmission between the nodes may be understood as meaningful information other than the protocol layer header from the data packet.

Optionally, the protocol layer header may include a media access control MAC header. The MAC header includes first indication information, and the first indication information includes a logical channel identity (LCID) corresponding to the data packet.

The LCID is used to identify a logical channel between an RLC layer and a MAC layer, the LCID and the logical channel may be in a one-to-one correspondence, and the LCID corresponding to the data packet is an LCID of a logical channel that corresponds to a channel from which the data comes and that is added by the second node to the data packet based on the channel from which the data comes, where the channel is a logical channel. Alternatively, the channel may be an RLC channel between an RLC layer and an upper protocol layer. For example, the RLC channel may be a channel between an RLC layer and a PDCP layer, or the RLC channel may be a channel between an RLC layer and an Adapt layer. Alternatively, the channel may be a channel between an RLC layer and an F1 interface protocol layer.

For example, that the second node adds, to the data packet, the LCID of the logical channel corresponding to the data packet includes:

if the data is data from the logical channel between the RLC layer and the MAC layer, the LCID corresponding to the data packet is an identifier of the logical channel; or if the data is data from the RLC channel between the RLC layer and the PDCP layer, the LCID corresponding to the data packet is an LCID of a logical channel corresponding to the channel between the RLC layer and the PDCP layer; or if the data is data from the RLC channel between the RLC layer and the Adapt layer, the LCID corresponding to the data packet is an LCID of a logical channel corresponding to the channel between the RLC layer and the Adapt layer; or if the data is data from the channel between the RLC layer and the F1 interface protocol layer, the LCID corresponding to the data packet is an LCID of a logical channel corresponding to the channel between the RLC layer and the F1 interface protocol layer.

For example, the second node receives information from a donor node, and the second node obtains a correspondence between the RLC channel and the LCID based on the information. Optionally, the second node stores the information, and the second node obtains the correspondence between the RLC channel and the LCID based on the information. Optionally, content included in the information may alternatively be specified in a protocol or a standard, and the second node device stores the information before delivery.

Optionally, the information includes information about a first group of LCIDs and/or information about a second group of LCIDs, the first group of LCIDs includes an LCID used for an access traffic, and the second group of LCIDs includes an LCID used for a backhaul traffic.

For example, a parent node of the second node, for example, a DU of the parent node, configures a plurality of logical channels for a wireless link between the second node and the parent node, and allocates a corresponding logical channel identity LCID to each logical channel. For example, if an LCID value range (converted into decimal) is [0, X], when allocating the logical channel identity, the parent node may determine an LCID used for the access traffic of the second node within a part, for example, a range of [0, Y], that belongs to the first group of LCIDs in the LCID value range (LCID space), and allocate the LCID to a logical channel used to serve the access traffic of the second node;

or the parent node may determine an LCID used for the backhaul traffic of the second node within a part, for example, a range of [Y, Z], that belongs to the second group of LCIDs in the LCID value range, and allocate the LCID to a logical channel used to serve the backhaul traffic of the second node, where X, Y, and Z are all positive integers, Y<Z, and Z≤X.

For example, the second node, for example, a DU of the second node, configures a plurality of logical channels for a wireless link between the second node and a child node, and allocates a corresponding logical channel identity LCID to each logical channel. For example, if an LCID value range (converted into decimal) is [0, X], when allocating the logical channel identity, the second node may determine an LCID used for the access traffic of the child node within a part, for example, a range of [0, Y], that belongs to the first group of LCIDs in the LCID value range (LCID space), and allocate the LCID to a logical channel used to serve the access traffic of the child node; or the second node may determine an LCID used for the backhaul traffic of the second node within a part, for example, a range of [Y, Z], that belongs to the second group of LCIDs in the LCID value range, and allocate the LCID to a logical channel used to serve the backhaul traffic of the child node, where X, Y, and Z are all positive integers, Y<Z, and Z≤X.

If the RLC channel is a channel between the RLC layer and the PDCP layer or the F1 interface protocol layer, the second node determines, in the first group of LCIDs, an LCID corresponding to the RLC channel. Specifically, after receiving RLC bearer configuration information, the second node may determine whether an LCID in the RLC bearer configuration information belongs to the first group of LCIDs or the second group of LCIDs. If the LCID belongs to the first group of LCIDs, the second node determines that the LCID corresponds to the channel between the RLC layer and the PDCP layer or the F1 interface protocol layer.

If the RLC channel is a channel between the RLC layer and the Adapt layer, the second node determines, in the second group of LCIDs, an LCID corresponding to the data packet. Specifically, after receiving RLC bearer configuration information, the second node may determine whether an LCID in the RLC bearer configuration information belongs to the first group of LCIDs or the second group of LCIDs. If the LCID belongs to the second group of LCIDs, the second node determines that the LCID corresponds to the channel between the RLC layer and the Adapt layer.

Optionally, the information is RLC bearer configuration information that is of a first node and that is used to set up a logical channel, and the RLC bearer includes the logical channel indicated by the LCID. If the information includes a radio bearer identifier, and the data packet sent by the second node is a downlink data packet, the LCID corresponds to the channel between the RLC layer and the F1 interface protocol layer of the DU of the second node. Alternatively, if the information includes a radio bearer identifier, and the data packet sent by the second node is an uplink data packet, the LCID corresponds to the channel between the RLC layer and the PDCP layer of the MT of the second node. If the information does not include a radio bearer identifier, and the data packet sent by the second node is a downlink data packet, the LCID corresponds to the channel between the RLC layer and the Adapt layer of the DU of the second node. Alternatively, if the information does not include a radio bearer identifier, and the data packet sent by the second node is an uplink data packet, the LCID corresponds to the channel between the RLC layer and the Adapt layer of the MT of the second node.

Optionally, the information is RLC bearer configuration information that is of the first node and that is used to set up a logical channel, an RLC bearer includes a logical channel indicated by the LCID, the information includes indication information, and values of the indication information include a first value and a second value. If the value of the indication information is the first value, and the data packet sent by the second node is a downlink data packet, the LCID corresponds to a channel between an RLC layer and an F1 interface protocol layer of a DU of the second node. Alternatively, if the value of the indication information is the first value, and the data packet sent by the second node is an uplink data packet, the LCID corresponds to a channel between an RLC layer and a PDCP layer of an MT of the second node. If the value of the indication information is the second value, and the data packet sent by the second node is a downlink data packet, the LCID corresponds to a channel between an RLC layer and an Adapt layer of a DU of the second node. Alternatively, if the value of the indication information is the second value, and the data packet sent by the second node is an uplink data packet, the LCID corresponds to a channel between an RLC layer and an Adapt layer of an MT of the second node. For example, the indication information may be in a form of a bitmap or a sequence. For example, the first value is 010, and the second value is 101.

Optionally, the protocol layer header may include a radio link control RLC header. The RLC header includes second indication information, and the second indication information includes indication information of an access traffic or indication information of a backhaul traffic.

For example, the second node receives the data through an RLC channel. If the RLC channel is a channel between the RLC layer and the PDCP layer or the F1 interface protocol layer, the second node determines that the second indication information is the indication information of the access traffic; or if the RLC channel is a channel between the RLC layer and the Adapt layer, the second node determines that the second indication information is the indication information of the backhaul traffic.

Optionally, the second node may determine, based on routing information in an Adapt PDU received by an adaptation layer entity, whether the current node is a target node of a route of the adaptation layer. If it is determined that the current node is the target node of the route of the adaptation layer, the second node determines that the second indication information is the indication information of the access traffic. If it is determined that the current node is not the target node of the route of the adaptation layer, the second node determines that the second indication information is the indication information of the backhaul traffic.

Operation 302: The second node sends the data packet to the first node.

The second node sends the data packet to the first node, where the data packet includes indication information that is of a type of the traffic data and that is determined by using the operation 301.

Optionally, the second node is a donor node, and the second node sends third indication information to the first node, where the third indication information indicates a correspondence between an RLC layer entity and an upper protocol layer entity of the RLC layer of the first node. In this case, the operation 301 is an optional operation.

With reference to descriptions of the method 300 in this embodiment, the following specifically describes a process in which an IAB node processes a data packet in combination with the protocol stack structures of the IAB network shown in FIG. 1B and FIG. 1C.

For downlink transmission, the DU of the IAB 2 may determine, based on an RLC bearer that is of the IAB 2 and that is used to receive data, whether the data is an access traffic or a backhaul traffic. If the IAB 2 determines, based on RLC bearer configuration information and/or LCID grouping information previously received from the donor node, that the RLC bearer is an RLC bearer used for the access traffic, an RLC layer of the DU of the IAB 2 may add first indication information to a MAC header of a data packet including the data, where the first indication information includes an LCID of a logical channel included in the RLC bearer. If the IAB 2 determines, based on RLC bearer configuration information and/or LCID grouping information previously received from the donor node, that the RLC bearer is an RLC bearer used for the backhaul traffic, an RLC layer of the DU of the IAB 2 may add first indication information to a MAC header of a data packet including the data, where the first indication information includes an LCID of a logical channel included in the RLC bearer.

For uplink transmission, the MT of the IAB 2 may determine, based on an RLC bearer that is of the IAB 2 and that is used to receive data, whether the data is an access traffic or a backhaul traffic. If the IAB 2 determines, based on RLC bearer configuration information and/or LCID grouping information previously received from the donor node, that the RLC bearer is an RLC bearer used for the access traffic, an RLC layer of the DU of the IAB 2 may add first indication information to a MAC header of a data packet including the data, where the first indication information includes an LCID of a logical channel included in the RLC bearer. If the IAB 2 determines, based on RLC bearer configuration information and/or LCID grouping information previously received from the donor node, that the RLC bearer is an RLC bearer used for the backhaul traffic, an RLC layer of the DU of the IAB 2 may add first indication information to a MAC header of a data packet including the data, where the first indication information includes an LCID of a logical channel included in the RLC bearer.

For downlink transmission, an RLC layer of the DU of the IAB 2 may determine, based on an upper protocol layer of the RLC layer from which the data received by the RLC layer comes, whether the data is an access traffic or a backhaul traffic. For example, if an RLC SDU that includes the data and that is received by the RLC layer of the DU of the IAB 2 is a PDCP PDU, the upper protocol layer of the RLC layer from which the data received by the RLC layer comes may be the F1 interface protocol layer, the data may be determined as the access traffic, and the RLC layer of the DU of the IAB 2 may add second indication information to an RLC header of a data packet that includes the data, where the second indication indicates that the data is the access traffic. If an RLC SDU that includes the data and that is received by the RLC layer of the DU of the IAB 2 is an Adapt PDU, the upper protocol layer of the RLC layer from which the data received by the RLC layer comes may be the Adapt layer, the data may be determined as the backhaul traffic, and the RLC layer of the DU of the IAB 2 may add second indication information to a MAC header of a data packet that includes the data, where the second indication information indicates that the data is the backhaul traffic.

Figure 4:
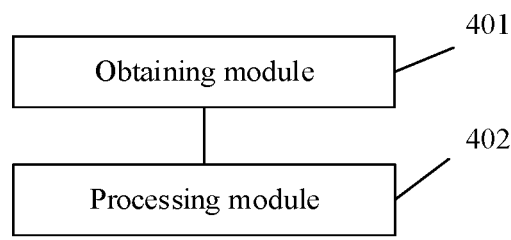
FIG. 4 is a schematic flowchart of a communication apparatus according to an embodiment of this application.

For uplink transmission, an RLC layer of the MT of the IAB 2 may determine, based on an upper protocol layer of the RLC layer from which the data received by the RLC layer comes, whether the data is an access traffic or a backhaul traffic. For example, if an RLC SDU that includes the data and that is received by the RLC layer of the DU of the IAB 2 is a PDCP PDU, the upper protocol layer of the RLC layer from which the data received by the RLC layer comes may be the PDCP layer, the data may be determined as the access traffic, and the RLC layer of the DU of the IAB 2 may add second indication information to an RLC header of a data packet that includes the data, where the second indication indicates that the data is the access traffic. If an RLC SDU that includes the data and that is received by the RLC layer of the DU of the IAB 2 is an Adapt PDU, the upper protocol layer of the RLC layer from which the data received by the RLC layer comes may be the Adapt layer, the data may be determined as the backhaul traffic, and the RLC layer of the DU of the IAB 2 may add second indication information to a MAC header of a data packet that includes the data, where the second indication information indicates that the data is the backhaul traffic. Based on the foregoing similar technical concepts, an embodiment of this application provides a communication apparatus. The apparatus may be a communication apparatus in the communication method/system provided in any one of the method 200 or the method 300 and the possible designs thereof in the foregoing embodiments. The communication apparatus includes: at least one corresponding unit configured to perform a method step, an operation, or an action performed by the communication device in the communication method/system provided in the method 200 or 300. The at least one unit may be configured in a one-to-one correspondence with the method step, the operation, or the action performed by the communication apparatus. These units may be implemented by using a computer program, may be implemented by using a hardware circuit, or may be implemented by using a computer program in combination with a hardware circuit. For example, the following specifically describes a structure and a function of a communication apparatus 400 with reference to FIG. 4 in the embodiments of this application. FIG. 4 is a schematic block diagram of the communication apparatus 400 according to an embodiment of this application.

For example, this application provides a first node 400, including: an obtaining module 401, configured to receive a data packet from a second node, where the data packet includes data and a media access control MAC header, the MAC header includes first indication information, and the first indication information includes a logical channel identity LCID corresponding to the data packet, or the data packet includes data and a radio link control RLC header, the RLC header includes second indication information, and the second indication information includes indication information of an access traffic or indication information of a backhaul traffic; or the obtaining module 401 is configured to receive third indication information, where the third indication information indicates a correspondence between an RLC layer entity and an upper protocol layer entity of an RLC layer of the first node 400; and a processing module 402, configured to deliver the data to an upper protocol layer of the RLC layer of the first node 400 based on the first indication information or the second indication information, where the first node 400 and the second node are nodes in wireless relay communication, and an upper protocol layer of an RLC layer includes any one of the following: a packet data convergence protocol PDCP layer, an adaptation Adapt layer, or an F1 interface protocol layer. For example, that a processing module 402 delivers the data to an upper protocol layer of the RLC layer of the first node 400 based on the first indication information includes: The processing module 402 delivers the data to the upper protocol layer of the RLC layer based on the LCID and a correspondence between the LCID and the upper protocol layer of the RLC layer.

Optionally, the obtaining module 401 may be further configured to receive information from a donor node, and the processing module 402 may be further configured to obtain the correspondence between the LCID and the upper protocol layer of the RLC layer based on the information.

For example, that the processing module 402 obtains the correspondence between the LCID and the upper protocol layer of the RLC layer based on the information includes: The information includes information about a first group of LCIDs and/or information about a second group of LCIDs, the first group of LCIDs includes an LCID used for the access traffic, and the second group of LCIDs includes an LCID used for the backhaul traffic; and if the LCID belongs to the first group of LCIDs, the upper protocol layer of the RLC layer is the PDCP layer or the F1 interface protocol layer; or if the LCID belongs to the second group of LCIDs, the upper protocol layer of the RLC layer is the Adapt layer.

Optionally, the information is used to configure an RLC bearer of the first node 400, where the RLC bearer includes a logical channel indicated by the LCID; and if the information includes a radio bearer identifier, the upper protocol layer of the RLC layer is the PDCP layer or the F1 interface protocol layer; or if the information does not include a radio bearer identifier, the upper protocol layer of the RLC layer is the Adapt layer.

Optionally, the information is used to configure an RLC bearer of the first node 400, where the RLC bearer includes a logical channel indicated by the LCID; the information includes indication information, and values of the indication information include a first value and a second value; and if the value of the indication information is the first value, the upper protocol layer of the RLC layer is the PDCP layer or the F1 interface protocol layer; or if the value of the indication information is the second value, the upper protocol layer of the RLC layer is the Adapt layer.

For example, that a processing module 402 delivers the data to the upper protocol layer of the RLC layer of the first node 400 based on the second indication information includes: If the second indication information includes the indication information of the access traffic, the processing module 402 delivers the data to the PDCP layer or the F1 interface protocol layer of the first node 400; or if the second indication information includes the indication information of the backhaul traffic, the processing module 402 delivers the data to the adaptation layer Adapt layer of the first node 400.

For example, that a processing module 402 delivers the data to the upper protocol layer of the RLC layer of the first node based on the third indication information includes: The first node receives the data by using the RLC layer entity; and if the third indication information indicates that the RLC layer entity corresponds to a PDCP layer entity or an F1 interface protocol layer entity, the first node delivers the data to the PDCP layer or the F1 interface protocol layer of the first node; or if the third indication information indicates that the RLC layer entity corresponds to an Adapt layer entity, the first node delivers the data to the Adapt layer of the first node.

For example, the F1 interface protocol layer is a protocol layer on a logical interface between a centralized unit CU of the donor node and a distributed unit DU of the node; a user plane of the F1 interface protocol layer includes a GPRS tunneling protocol-user plane GTP-U layer, a user datagram protocol UDP layer, and an internet protocol IP layer; and a control plane of the F1 interface protocol layer includes an F1 interface application F1AP layer, a stream control transmission protocol SCTP layer, and an internet protocol IP layer.

Figure 5:
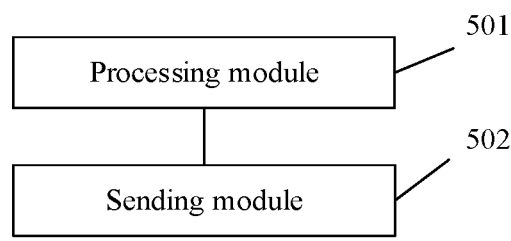
FIG. 5 is a schematic flowchart of a communication apparatus according to an embodiment of this application.

Based on the foregoing similar technical concepts, an embodiment of this application provides a communication apparatus. The apparatus may be a communication apparatus in the communication method/system provided in any one of the method 200 or the method 300 and the possible designs thereof in the foregoing embodiments. The communication apparatus includes: at least one corresponding unit configured to perform a method step, an operation, or an action performed by the communication device in the communication method/system provided in the method 200 or 300. The at least one unit may be configured in a one-to-one correspondence with the method step, the operation, or the action performed by the communication apparatus. These units may be implemented by using a computer program, may be implemented by using a hardware circuit, or may be implemented by using a computer program in combination with a hardware circuit. For example, the following specifically describes a structure and a function of a communication apparatus 500 with reference to FIG. 5 in the embodiments of this application. FIG. 5 is a schematic block diagram of the communication apparatus 500 according to an embodiment of this application.

For example, this application provides a second node 500, including: a sending module 502, configured to send a data packet to a first node; or the sending module 502 is configured to send third indication information to the first node, where the third indication information indicates a correspondence between an RLC layer entity and an upper protocol layer entity of an RLC layer of the first node 400.

The data packet includes data and a media access control MAC header, the MAC header includes first indication information, and the first indication information includes a logical channel identity LCID that corresponds to the data and that is determined by a processing module 501 of the second node; or the data packet includes data and a radio link control RLC header, the RLC header includes second indication information, and the second indication information includes indication information that is of an access traffic or indication information that is of a backhaul traffic and that is determined by a processing module 501 of the second node, where the first indication information, the second indication information, or the third indication information is used to indicate the first node to deliver the data to an upper protocol layer of the RLC layer; and the first node and the second node are nodes in wireless relay communication, and an upper protocol layer of an RLC layer includes any one of the following: a packet data convergence protocol PDCP layer, an adaptation Adapt layer, or an F1 interface protocol layer.

For example, that the processing module 501 determines the LCID corresponding to the data packet includes: The processing module 501 receives the data through an RLC channel, and the processing module 501 determines the LCID corresponding to the RLC channel.

Optionally, the processing module 501 may be further configured to receive information from a donor node, and the processing module 501 obtains a correspondence between the RLC channel and the LCID based on the information.

For example, that the processing module 501 obtains a correspondence between the RLC channel and the LCID based on the information includes: The information is used to configure an RLC bearer of the second node, where the RLC bearer includes a logical channel indicated by the LCID; and if the information includes a radio bearer identifier, the RLC channel corresponding to the LCID is a channel between the RLC layer and the PDCP layer or the F1 interface protocol layer; or if the information does not include a radio bearer identifier, the RLC channel corresponding to the LCID is a channel between the RLC layer and the Adapt layer.

Optionally, the information includes information about a first group of LCIDs and/or information about a second group of LCIDs, the first group of LCIDs are LCIDs used for the access traffic, and the second group of LCIDs are LCIDs used for the backhaul traffic; and if the RLC channel is a channel between the RLC layer and the PDCP layer or the F1 interface protocol layer, the processing module 501 determines, in the first group of LCIDs, the LCID corresponding to the RLC channel; or if the RLC channel is a channel between the RLC layer and the Adapt layer, the processing module 501 determines, in the second group of LCIDs, the LCID corresponding to the data packet.

Optionally, the information is used to configure an RLC bearer of the second node 500, where the RLC bearer includes a logical channel indicated by the LCID; the information includes indication information, and values of the indication information include a first value and a second value; and if the value of the indication information is the first value, the RLC channel corresponding to the LCID is a channel between the RLC layer and the PDCP layer or the F1 interface protocol layer; or if the value of the indication information is the second value, the RLC channel corresponding to the LCID is a channel between the RLC layer and the Adapt layer.

For example, that the processing module 501 determines the indication information of the access traffic or the indication information of the backhaul traffic includes: The processing module 501 receives the data through an RLC channel, where if the RLC channel is a channel between the RLC layer and the PDCP layer or the F1 interface protocol layer, the processing module 501 determines that the second indication information is the indication information of the access traffic; or if the RLC channel is a channel between the RLC layer and the Adapt layer, the processing module 501 determines that the second indication information is the indication information of the backhaul traffic.

For example, the F1 interface protocol layer is a protocol layer on a logical interface between a centralized unit CU of the donor node and a distributed unit DU of the node; a user plane of the F1 interface protocol layer includes a GPRS tunneling protocol-user plane GTP-U layer, a user datagram protocol UDP layer, and an internet protocol IP layer; and a control plane of the F1 interface protocol layer includes an F1 interface application F1AP layer, a stream control transmission protocol SCTP layer, and an internet protocol IP layer.

For example, this application provides a donor node 500, including: a sending module 502, where the sending module 502 is configured to send information to a first node, where the information includes information about a first group of LCIDs and/or information about a second group of LCIDs, the first group of LCIDs includes an LCID used for an access traffic, and the second group of LCIDs includes an LCID used for a backhaul traffic; or the information is used to configure an RLC bearer of the first node, where the RLC bearer includes an RLC layer entity and a logical channel, and if the information includes a radio bearer identifier, an upper protocol layer of an RLC layer is a PDCP layer or an F1 interface protocol layer; or if the information does not include a radio bearer identifier, an upper protocol layer of an RLC layer is an Adapt layer; or the information is used to configure an RLC bearer of the first node, where the RLC bearer includes an RLC layer entity and a logical channel, the information includes indication information, and values of the indication information include a first value and a second value; and if the value of the indication information is the first value, an upper protocol layer of an RLC layer is a PDCP layer or an F1 interface protocol layer; or if the value of the indication information is the second value, an upper protocol layer of an RLC layer is an Adapt layer Optionally, the sending module 502 is further configured to send another information to the first node, where the information is used to configure the RLC bearer of the first node, the RLC bearer includes the RLC layer entity and the logical channel, and if an LCID corresponding to the logical channel belongs to the first group of LCIDs, the upper protocol layer of the RLC layer is the PDCP layer or the F1 interface protocol layer; or if an LCID corresponding to the logical channel belongs to the second group of LCIDs, the upper protocol layer of the RLC layer is the Adapt layer.

Figure 6:
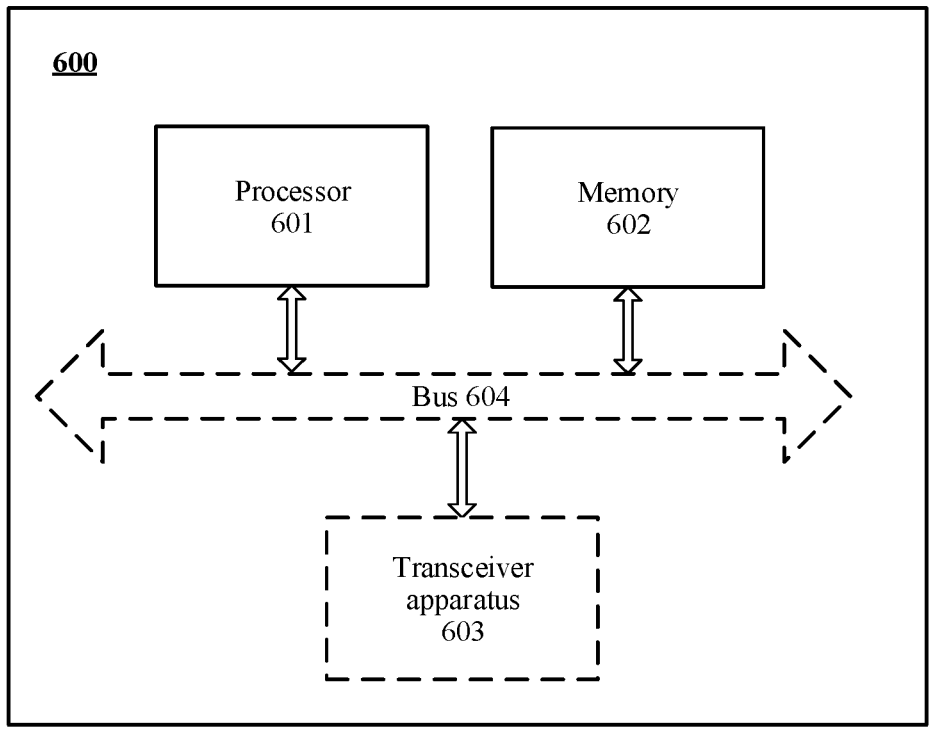
FIG. 6 is a schematic block diagram of a communication apparatus according to an embodiment of this application.

Based on a same technical concept, an embodiment of this application further provides a communication apparatus. The communication apparatus may be configured to implement a function performed by any terminal device or any radio access network device in the foregoing method embodiments. The following specifically describes a structure and a function of a communication apparatus 600 with reference to FIG. 6 in the embodiments of this application. FIG. 6 is a schematic block diagram of the communication apparatus 600 according to an embodiment of this application. The communication apparatus may include at least one processor 601. When program instructions are executed in the at least one processor 601, a function of the terminal device or the radio access network device in any design in the communication method/system provided in the method 200 or 300 is implemented. Optionally, the communication apparatus 600 may further include at least one memory 602, and the memory 602 may be configured to store required program instructions and/or required data. For brevity, details are not described herein again. Optionally, the communication apparatus 600 may further include a transceiver apparatus 603. The transceiver apparatus 603 may be used by the communication apparatus 600 to perform communication interaction with another communication device (for example, a radio access network device or a terminal device, which is not limited herein), for example, exchange control signaling and/or traffic data. The transceiver apparatus 603 may be implemented by using a circuit having a communication transceiver function. Optionally, as shown in FIG. 6, the communication apparatus 600 may further include a bus 604, and the components in the communication apparatus 600 may be interconnected through the bus 604.

Figure 7:
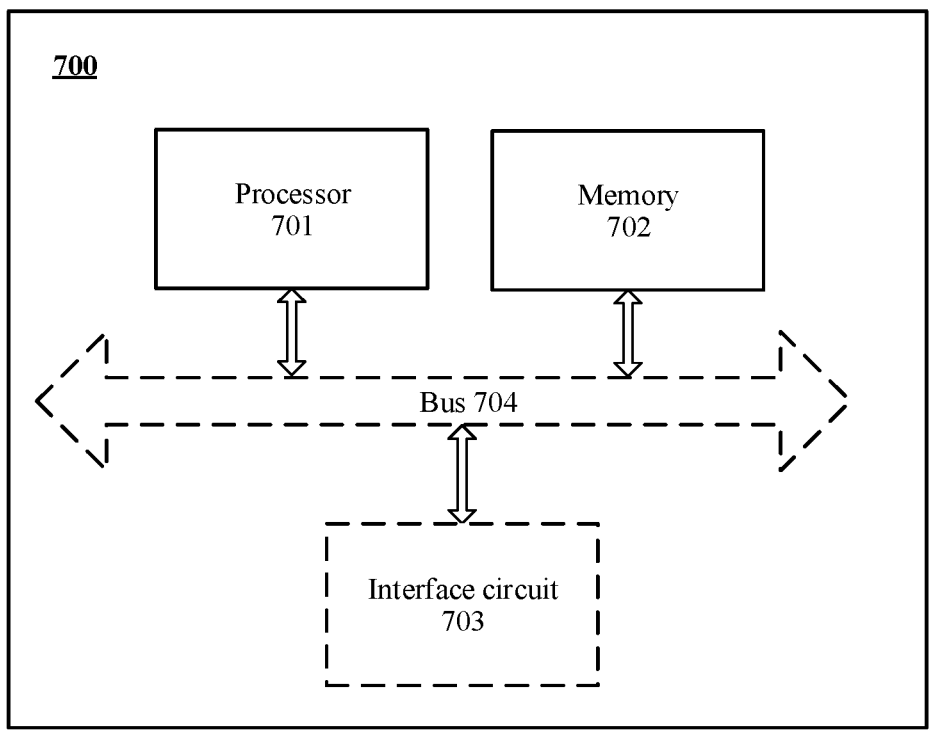
FIG. 7 is a schematic block diagram of a system chip according to an embodiment of this application.

An embodiment of this application provides a system chip 700. The following specifically describes a structure and a function of the system chip 700 with reference to FIG. 7 in the embodiments of this application. FIG. 7 is a schematic block diagram of the system chip 700 according to an embodiment of this application. The system chip 700 may be used in any terminal device or any radio access network device described above. Processing performed by the system chip enables the terminal device or the radio access network device to perform an operation of the terminal device or the radio access network device in any possible design solution of the communication method/system provided in the methods 300 to 500 in the embodiments of this application. As shown in FIG. 7, the system chip 700 may include at least one processor 701. When program instructions are executed in the at least one processor 701, an operation of the terminal device or the radio access network device in any possible design solution of the communication method/system provided in the method 200 or 300 in the embodiments of this application is implemented. Optionally, the system chip 700 may further include at least one memory 702, and the memory 702 stores the related program instructions. Optionally, the system chip 700 may further include an interface circuit 703 and a bus 704. The at least one processor 701, the at least one memory 702, and the interface circuit 703 are coupled through the bus 704. The system chip 700 interacts with a terminal device, a radio access network device, or another device in a network through the interface circuit 703. Optionally, the processor 701 and the memory 702 may be combined into one processing apparatus. For example, during specific implementation, the memory 702 may alternatively be integrated into the processor 701, or may be independent of the processor 701.

A person skilled in the art may clearly understand that, for the purpose of convenient and brief description, division of the foregoing function modules is merely used as an example for description. In an actual application, the foregoing functions may be allocated to different function modules for implementation based on a requirement. That is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the embodiments in this application, it should be understood that the disclosed system, apparatus, and method may be implemented in other manners. For example, the described apparatus embodiment is merely an example. For example, the module or unit division is merely logical function division and may be other division in actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

It should be understood that the processor in the embodiments of this application may be a central processing unit (CPU), or the processor may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, any conventional processor, or the like.

It may be further understood that the memory in the embodiments of this application may be a volatile memory or a non-volatile memory, or may include a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, many forms of random access memories (RAM) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

In the embodiments of this application, the units described as separate components may or may not be physically separate, and components displayed as units may or may not be physical units, may be located in one position, or may be distributed on a plurality of network units. Some or all of the units may be selected based on actual requirements to achieve the objectives of the solutions in the embodiments of this application.

In addition, the function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of the software function unit and sold or used as an independent product, the integrated unit may be stored in a computer-readable storage medium. Based on such an understanding, the technical solutions of this application essentially, or the part contributing to the current technology, or all or some of the technical solutions may be implemented in a form of a software product. The computer software product is stored in a storage medium and includes several instructions for instructing a computer device (which may be a personal computer, a server, a radio access network device, or the like) or a processor to perform all or some of the operations of the methods in the embodiments of this application. The foregoing storage medium may include any medium or computer storage medium that can store program code, such as a USB flash drive, a removable hard disk, a read-only memory (ROM), a random access memory (RAM), a magnetic disk, or an optical disc.

The foregoing descriptions are merely specific implementations of this application, but the protection scope of this application is not limited thereto. Any variation or replacement that can be readily figured out by a person skilled in the art within the technical scope disclosed in this application shall fall within the protection scope of this application.

What is claimed is:
1. A communication apparatus, comprising:
at least one processor; and
one or more memories coupled to the at least one processor and storing programming instructions for execution by the at least one processor to perform operations comprising:
receiving a data packet from a second node, wherein the data packet comprises data and a media access control (MAC) header, the MAC header comprising first indication information, and the first indication information comprising a logical channel identity (LCID) corresponding to the data;

determining, using the LCID, an upper protocol layer of a radio link control (RLC) layer from a packet data convergence protocol (PDCP) layer and an adaptation (Adapt) layer; and delivering the data to the upper protocol layer of the RLC layer according to the first indication information.

2. The apparatus according to claim 1, wherein delivering the data to the upper protocol layer of the RLC layer according to the first indication information comprises:

delivering the data to the upper protocol layer of the RLC layer according to the LCID and a correspondence between the LCID and the upper protocol layer of the RLC layer.

3. The apparatus according to claim 2, wherein the operations further comprise:

receiving information from a donor node; and obtaining the correspondence between the LCID and the upper protocol layer of the RLC layer according to the information received from the donor node.

4. The apparatus according to claim 3, wherein the information received from the donor node comprises at least one of information about a first group of LCIDs or information about a second group of LCIDs, the first group of LCIDs comprises an LCID used for access traffic, and the second group of LCIDs comprises an LCID used for backhaul traffic.

5. The apparatus according to claim 4, wherein when the LCID belongs to the first group of LCIDs, the upper protocol layer of the RLC layer is the PDCP layer or the F1 interface protocol layer.

6. The apparatus according to claim 4, wherein when the LCID belongs to the second group of LCIDs, the upper protocol layer of the RLC layer is the Adapt layer.

7. The apparatus according to claim 3, wherein the information received from the donor node is used to configure an RLC bearer, wherein the RLC bearer comprises a logical channel indicated by the LCID.

8. The apparatus according to claim 7, wherein when the information received from the donor node comprises a radio bearer identifier, the upper protocol layer of the RLC layer is the PDCP layer or the F1 interface protocol layer.

9. The apparatus according to claim 7, wherein when the information received from the donor node does not comprise a radio bearer identifier, the upper protocol layer of the RLC layer is the Adapt layer.

10. The apparatus according to claim 3, wherein:

the information received from the donor node is used to configure an RLC bearer, wherein the RLC bearer comprises a logical channel indicated by the LCID; and the information received from the donor node comprises second indication information, wherein a value of the second indication information comprises at least one of a first value or a second value.

11. The apparatus according to claim 10, wherein when the value of the second indication information is the first value, the upper protocol layer of the RLC layer is the PDCP layer or the F1 interface protocol layer.

12. The apparatus according to claim 10, wherein when the value of the second indication information is the second value, the upper protocol layer of the RLC layer is the Adapt layer.

13. A communication apparatus, comprising:

at least one processor; and one or more memories coupled to the at least one processor and storing programming instructions for execution by the at least one processor to perform operations comprising:

determining a logical channel identity (LCID) that corresponds to data; and sending a data packet to a first node, wherein the data packet comprises the data and a media access control (MAC) header, the MAC header comprises first indication information, and the first indication information comprises the determined LCID, wherein the determined LCID is used to determine an upper protocol layer of a radio link control (RLC) layer from a packet data convergence protocol (PDCP) layer and an adaptation (Adapt) layer, and wherein the first indication information indicates the first node to deliver the data to the upper protocol layer of the RLC layer.

14. The apparatus according to claim 13, wherein determining the LCID comprises:

receiving the data through an RLC channel; and determining the LCID corresponding to the RLC channel.

15. The apparatus according to claim 14, wherein the operations further comprise:

receiving information from a donor node; and obtaining a correspondence between the RLC channel and the LCID according to the information received from the donor node.

16. The apparatus according to claim 15, wherein:

the information received from the donor node is used to configure an RLC bearer, wherein the RLC bearer comprises a logical channel indicated by the LCID; and when the information received from the donor node comprises a radio bearer identifier, the RLC channel corresponding to the LCID is a channel between the RLC layer and the PDCP layer or the F1 interface protocol layer; or when the information received from the donor node does not comprise a radio bearer identifier, the RLC channel corresponding to the LCID is a channel between the RLC layer and the Adapt layer.

17. The apparatus according to claim 15, wherein the information received from the donor node comprises at least one of information about a first group of LCIDs or information about a second group of LCIDs, the first group of LCIDs are LCIDs used for access traffic, and the second group of LCIDs are LCIDs used for backhaul traffic, and wherein the determining the LCID corresponding to the RLC channel comprises:

in response to the RLC channel being a channel between the RLC layer and the PDCP layer or the F1 interface protocol layer, determining the LCID corresponding to the RLC channel in the first group of LCIDs; or in response to the RLC channel being a channel between the RLC layer and the Adapt layer, determining the LCID corresponding to the data packet in the second group of LCIDs.

18. The apparatus according to claim 15, wherein:

the information received from the donor node is used to configure an RLC bearer, wherein the RLC bearer comprises a logical channel indicated by the LCID;

the information received from the donor node comprises second indication information, wherein a value of the second indication information comprises at least one of a first value or a second value; and when the value of the second indication information is the first value, the RLC channel corresponding to the LCID is a channel between the RLC layer and the PDCP layer or the F1 interface protocol layer; or when the value of the second indication information is the second value, the RLC channel corresponding to the LCID is a channel between the RLC layer and the Adapt layer.

19. A communication apparatus, comprising:

at least one processor; and one or more memories coupled to the at least one processor and storing programming instructions for execution by the at least one processor to perform operations comprising:

sending information to a first node, wherein the information comprises at least one of information about a first group of logical channel identities (LCIDs) or information about a second group of LCIDs, the first group of LCIDs comprises an LCID used for access traffic, and the second group of LCIDs comprises an LCID used for backhaul traffic; and sending another information to the first node, wherein the another information is used to configure a radio link control (RLC) bearer of the first node, the RLC bearer comprises a RLC layer entity and a logical channel, wherein when an LCID corresponding to the logical channel belongs to the first group of LCIDs, an upper protocol layer of a RLC layer is a packet data convergence protocol (PDCP) layer or an F1 interface protocol layer, and wherein the LCID is used to determine the upper protocol layer of the RLC layer from a packet data convergence protocol (PDCP) layer and an adaptation (Adapt) layer.

20. The apparatus according to claim 19, wherein when an LCID corresponding to the logical channel belongs to the second group of LCIDs, the upper protocol layer of the RLC layer is an adaptation (Adapt) layer.

* * * * *